United States Patent
Takahashi et al.

(10) Patent No.: US 7,712,664 B2
(45) Date of Patent: May 11, 2010

(54) 2-DIMENSIONAL CODE PATTERN, 2-DIMENSIONAL CODE PATTERN SUPPORTING MEDIUM, 2-DIMENSIONAL CODE PATTERN GENERATING METHOD, AND 2-DIMENSIONAL CODE READING APPARATUS AND METHOD

(75) Inventors: Sadao Takahashi, Kanagawa (JP); Taiga Asano, Kanagawa (JP); Makoto Yamasaki, Tokyo (JP); Tomohiko Beppu, Kanagawa (JP); Toshiyuki Furuta, Kanagawa (JP); Nobuyuki Doi, Tokyo (JP); Hitoshi Hattori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1185 days.

(21) Appl. No.: 11/245,082

(22) Filed: Oct. 7, 2005

(65) Prior Publication Data

US 2006/0049260 A1    Mar. 9, 2006

Related U.S. Application Data

(63) Continuation of application No. 10/447,223, filed on May 29, 2003, now Pat. No. 6,959,866.

(30) Foreign Application Priority Data

| May 30, 2002 | (JP) | ............................. 2002-157275 |
| Jul. 10, 2002 | (JP) | ............................. 2002-201611 |
| Dec. 25, 2002 | (JP) | ............................. 2002-375260 |

(51) Int. Cl.
*G06K 7/14*   (2006.01)

(52) U.S. Cl. .................................................. 235/454

(58) Field of Classification Search ................................
235/462.01–462.49, 494, 454
See application file for complete search history.

(56) References Cited

U.S. PATENT DOCUMENTS

| 4,745,269 | A | * | 5/1988 | Van Gils ..................... 235/487 |
| 4,835,544 | A | | 5/1989 | Winterbum |
| 5,051,736 | A | | 9/1991 | Bennett et al. |
| 5,661,506 | A | | 8/1997 | Lazzouni et al. |
| 5,825,015 | A | | 10/1998 | Chen |
| 6,330,976 | B1 | | 12/2001 | Dymetman et al. |
| 6,446,866 | B1 | | 9/2002 | Tatsuta |

FOREIGN PATENT DOCUMENTS

| JP | 3-37707 | 2/1991 |
| JP | 7-141104 | 6/1995 |

(Continued)

*Primary Examiner*—Jamara A Franklin
(74) *Attorney, Agent, or Firm*—Oblon, Spivak, McClelland, Maier & Neustadt, L.L.P.

(57) ABSTRACT

A 2-dimensional code reading apparatus includes a code position detector receiving an input image that is formed by optically reading 2-dimensional codes, and extracting a 2-dimensional codes from the input image. A data acquisition unit acquires identification information of a document page and positional information of the 2-dimensional codes on the document page, from the 2-dimensional codes. A data decoder performs decoding of the identification information and the positional information. The code position detector is provided with a code frame detector detecting a code frame which defines a fixed region of the 2-dimensional codes, and determining a dot of a target pixel as being a corner dot of the code frame.

16 Claims, 25 Drawing Sheets

FOREIGN PATENT DOCUMENTS

| | | |
|---|---|---|
| JP | 11-219405 | 8/1999 |
| JP | 2000-30016 | 1/2000 |
| JP | 2000-293303 | 10/2000 |
| JP | 2000-340840 | 12/2000 |
| WO | WO 00/73981 | 12/2000 |
| WO | WO 01/41003 A1 | 6/2001 |

* cited by examiner

|  | X | Y | ID | | | ERR. COR. | | | | ERR. COR. RESULT |
|---|---|---|---|---|---|---|---|---|---|---|
|  | 1 | 1 | 1 | 2 | 3 | 1 | 2 | 3 | 4 |  |
| RIGHT DATA | 12 | 41 | 0 | 0 | 23 | 21 | 128 | 37 | 64 | NO ERROR |
| RESTORED DATA | 12 | 40 | 2 | 8 | 23 | 21 | 128 | 37 | 64 | CANNOT CORRECT |
| ID PERMUTATION | 12 | 40 | 0 | 0 | 23 | 21 | 128 | 37 | 64 | CAN CORRECT |

SCANNING DIRECTION →

| Th | DOC. ID PERMUTATION | |
|---|---|---|
| | YES | NO |
| 1 | 78.8% | 67.0% |
| 2 | 79.5% | 75.7% |
| 3 | 78.5% | 78.0% |
| 4 | 75.8% | 75.7% |
| 5 | 73.7% | 73.7% |
| 6 | 70.7% | 70.7% |
| 7 | 69.3% | 69.3% |
| 8 | 67.3% | 67.3% |

FIG.28

DOCUMENT DATA BASE

| DOC. ID | DOC. NAME | PATH NAME | OPERATOR | DATE OF RENEWAL | PAGE | NO. OF PAGES | COOR. FILE |
|---|---|---|---|---|---|---|---|
| 123456 | patent.doc | \\machine609\MyDocument | T.S. | 20010110 | 1 | 2 | 123456.ary |
| 123457 | patent.doc | \\machine609\MyDocument | T.S. | 20010110 | 2 | 2 | 123457.ary |
| 123458 | fig.gif | \\machine609\MyDocument | T.S. | 20010113 | 1 | 1 | |
| 123459 | billing.doc | \\machine609\MyDocument | T.S. | 20010120 | 1 | 1 | |
| 123460 | report.ppt | \\machine609\MyDocument | T.S. | 20010201 | 1 | 1 | |
| 123461 | chart.xls | \\machine609\MyDocument | T.S. | 20010204 | 1 | 1 | |
| | | | | | | | |
| | | | | | | | |
| | | | | | | | |

2-DIMENSIONAL CODE PATTERN, 2-DIMENSIONAL CODE PATTERN SUPPORTING MEDIUM, 2-DIMENSIONAL CODE PATTERN GENERATING METHOD, AND 2-DIMENSIONAL CODE READING APPARATUS AND METHOD

CROSS-REFERENCE TO RELATED APPLICATIONS

This application is a continuation of and claims priority under 35 U.S.C. §120 to U.S. application Ser. No. 10/447,223, filed May 29, 2003, now U.S. Pat. No. 6,959,866 and is based upon and claims the benefit of priority under 35 U.S.C. 119 from the prior Japanese Patent Application No. 2002-157275, filed on May 30, 2002, Japanese Patent Application No. 2002-201611, filed on Jul. 10, 2002, and Japanese Patent Application No. 2002-375260, filed on Dec. 25, 2002, the entire contents of each of which are incorporated herein by reference.

BACKGROUND OF THE INVENTION

1. Field of the Invention

The present invention relates to an image reading technique that generates a 2-dimensional code pattern including coded coordinates information, and reads recorded (or drawing) information with the 2-dimensional code pattern from a supporting medium on which the 2-dimensional code pattern is printed, and detects the locus of the recorded information.

More specifically, the present invention relates to a 2-dimensional code pattern that is printed with a document on a supporting medium without requiring special ink, and its generation technique that can reduce the reading error. The present invention relates to a 2-dimensional code reading technique that efficiently reads the printed 2-dimensional code pattern and processes the same on real time.

2. Description of the Related Art

The technique of specifying the position and the contents of the image information formed on a print medium, such as paper, by arranging the 2-dimensional code including the coded coordinates information on the print medium is known.

The conventional 1-dimensional bar code has information only horizontally. However, the 2-dimensional code has information to the horizontal direction and the vertical direction, and it can express more complicated information.

There is also known the technique that reads another image information with the 2-dimensional code pattern, inputs the read information into a data processing device, such as a computer, and processes the same in order to utilize the 2-dimensional code more effectively.

The 2-dimensional code symbol which can be read is optically arranged in the shape of a matrix on paper, and the technique which reads the 2-dimensional code symbol with the camera, and acquires coordinates information is known at the same time it corrects the paper with the pen equipped with the small camera. For example, Japanese Laid-Open Patent Application No. 2000-293303 discloses the above technique.

By this method, the information of the 2-dimensional code that is added by the handwriting on the paper can be read on real time, and the added information can be associated with the on-paper information before the handwriting, and the processed information can be stored.

There is also known the technique which uses the print medium of paper on which the pattern indicating the X coordinate and the Y coordinate, the pattern indicating the direction of the code, and the forming pattern, which is larger than the other patterns, are printed, and reproduces the recorded characters from the print medium. For example, U.S. Pat. No. 5,661,506 discloses the above technique.

The forming pattern and the other patterns are printed in the infrared ink on the print medium, and they are not visible with the human eyes. By reading these patterns optically, the coordinates positions of the characters written to the print medium with the usual marker are determined by the read information.

Furthermore, there is known the 2-dimensional code pattern which is constituted by the dots arranged and shifted by the predetermined amount in a different direction from the predetermined position, the 2-dimensional code pattern being able to represent two or more bits of information per dot. For example, the International Publication No. WO 00/73981 discloses the above 2-dimensional code pattern.

The 2-dimensional code pattern has the horizontal and vertical coordinates information, and when the 2-dimensional code is read, it is possible to acquire the positional information which is indicated by the 2-dimensional code on the paper.

In the above technique disclosed by Japanese Laid-Open Patent Application No. 2000-293303, the general-purpose 2-dimensional codes that are standardized by the AIM standard are arranged dispersedly, and the magnitude of each code is large. For this reason, in order to acquire the coordinates information indicated by the 2-dimensional codes, it is necessary to pickup the comparatively large region of the paper with the optical pen. As the image pickup region is wide, the quality of the read image will deteriorate due to the depth of field, and it will become difficult to correctly read the 2-dimensional codes continuously.

Moreover, the general-purpose 2-dimensional codes are not originally intended to acquire the coordinates information while it is visualized the paper during the writing with the camera, and it takes much time to complete the decoding of the read information, and it is difficult to process it on real time.

One of the major purposes of the above document is to acquire continuous drawing information;, and if it cannot determine the coordinates positions continuously from the 2-dimensional codes, the discontinuity of the drawing information arises and it has the problem that the correct drawing information is not easily acquired.

In the above technique disclosed by U.S. Pat. No. 5,661,506, the infrared ink is used to print the 2-dimensional code pattern on the print medium with special printing equipment. The 2-dimensional code pattern cannot be embedded on the print medium by using a usual printer simultaneously with the time of printing the document on the print medium.

When the user prints the desired document and performs drawing correction on the paper where the infrared pattern is formed beforehand, correlation of the drawing information with the original electronic document cannot be produced, and only the drawing information will be reproduced.

In the technique disclosed by the International Publication No. WO 00/73981, by shifting the dots delicately from the 2-dimensional positions at regular intervals and arranging them, two or more bits of information are given to one dot, and the positional information of the code can be carried by the matrix of 6×6 dots.

However, in the above technique, the shifting amount is very small (30 micrometers). When the resolution (1200 dpi) of the widely-used laser printer is taken into account, it is difficult to reproduce the right amount of shifting because it requires the accuracy of paper feed, the rotating speed of the photoconductor etc.

Therefore, it is also necessary for the above technique to prepare the print medium on which the 2-dimensional code pattern is printed beforehand using a special printing technique, such as offset printing, and the problem that is essentially the same as that of U.S. Pat. No. 5,661,506 arises.

SUMMARY OF THE INVENTION

An object of the present invention is to provide an improved 2-dimensional code pattern in which the above-described problems are eliminated.

Another object of the present invention is to provide a 2-dimensional code pattern which enables the continuous acquisition of the exact drawing information and enables the on-demand printing along with the printing of a document using the existing office printer or the existing personal printer.

Another object of the present invention is to provide a print medium that supports a 2-dimensional code pattern which enables the continuous acquisition of the exact drawing information and enables the on-demand printing along with the printing of a document using the existing office printer or the existing personal printer.

Another object of the present invention is to provide a method of generation of a 2-dimensional code pattern which enables the continuous acquisition of the exact drawing information and enables the on-demand printing along with the printing of a document using the existing office printer or the existing personal printer.

Another object of the present invention is to provide a 2-dimensional code reading apparatus and method that is appropriate for and makes effective use of a 2-dimensional code pattern which enables the continuous acquisition of the exact drawing information and enables the on-demand printing along with the printing of a document using the existing office printer or the existing personal printer.

The above-mentioned objects of the present invention are achieved by a 2-dimensional code pattern comprising: a code frame which defines a fixed region by dots arranged at a predetermined spacing; and a data region provided within the code frame and indicating predetermined information using the dots, wherein the predetermined information includes positional information indicating a position of the code frame on an arbitrary page of a document, and identification information of the document page.

The above-mentioned objects of the present invention are achieved by a 2-dimensional code pattern supporting medium which includes a supporting base and a 2-dimensional code pattern arranged in a matrix formation on an entire surface of the supporting base, the 2-dimensional code pattern comprising: a code frame which defines a fixed region by dots arranged at a predetermined spacing; and a data region provided within the code frame and indicating predetermined information using the dots, wherein the predetermined information includes positional information indicating a position of the code frame on an arbitrary page of a document, and identification information of the document page.

The above-mentioned objects of the present invention are achieved by a 2-dimensional code pattern generation method comprising the steps of: acquiring identification information of a document page being printed; acquiring positional information indicating a position of a 2-dimensional code pattern on the document page; producing the 2-dimensional code pattern by encoding the identification information and the positional information using dots arranged at a predetermined spacing; and arranging the dots of the 2-dimensional code pattern in a matrix formation on the document page.

The above-mentioned objects of the present invention are achieved by a 2-dimensional code reading apparatus comprising: a code position detector receiving an input image that is formed by optically reading 2-dimensional codes, which are constituted by minute dots and printed on a print medium together with a document page, the code position detector extracting the 2-dimensional codes from the received input image; a data acquisition unit acquiring identification information of the document page and positional information of the 2-dimensional codes on the document page, from the 2-dimensional codes sent from the code position detector; a decoder performing decoding of the identification information and the positional information sent from the data acquisition unit, wherein the code position detector is provided with a code frame detector which detects a code frame which defines a fixed region of the 2-dimensional codes, the code frame detector determining a dot of a target pixel as being a corner dot of the code frame when four or more neighboring dots centering on the dot of the target pixel are detected and two sets of symmetric dots with respect to the dot of the target pixel are detected among the neighboring dots.

According to the present invention, using the existing office printer or the existing home-use printer, the 2-dimensional code pattern can be printed with the document page on demand. Moreover, when the print medium including the 2-dimensional code pattern is corrected continuously, the drawing information can be read correctly according to the 2-dimensional code reading technique of the present invention.

Furthermore, according to the 2-dimensional code reading technique of the present invention, the read drawing information can be made to correlate with the original electronic document, and the drawing information can be reflected into the document. Moreover, by setting up the processing region according to each processing stage, the 2-dimensional code pattern can be read efficiently and real time processing is possible.

BRIEF DESCRIPTION OF THE DRAWINGS

Other objects, features and advantages of the present invention will be apparent from the following detailed description when read in conjunction with the accompanying FIGS.

FIG. 28 is a diagram showing an example of the data composition of the document-management data base of FIG. 5.

DETAILED DESCRIPTION OF PREFERRED EMBODIMENTS

A description will now be provided of the preferred embodiments of the present invention with reference to the accompanying drawings.

Figure 1:
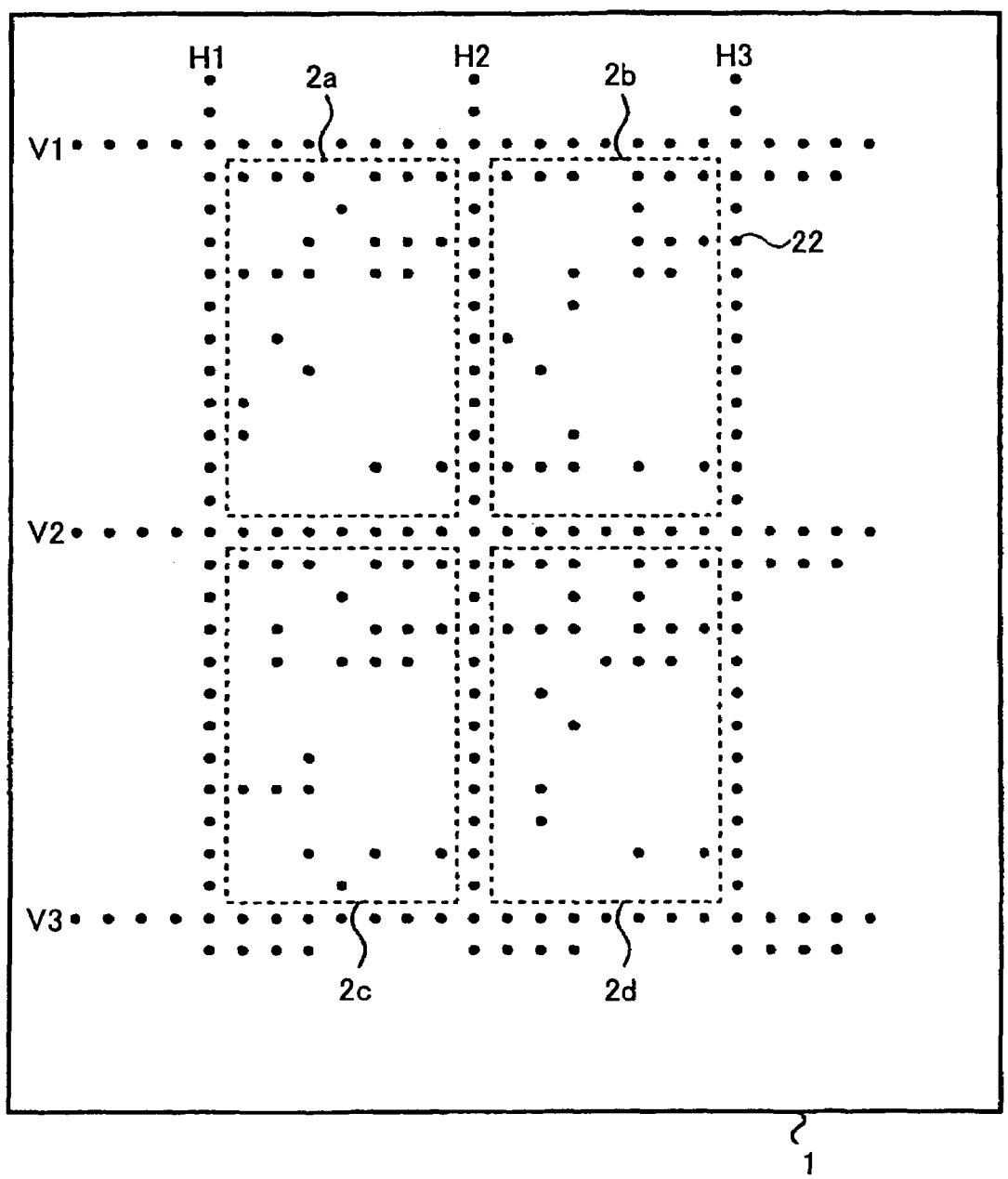
FIG. 1 is a diagram showing a print medium on which a 2-dimensional code pattern of one preferred embodiment of the present invention is printed.

FIG. 1 shows the print medium 1 which carries the 2-dimensional code pattern of one preferred embodiment of the present invention.

The print medium 1 is composed of a supporting base, such as paper, and a 2-dimensional code pattern which is continuously arranged on an entire surface of the supporting base in the form of a matrix of 2-dimensional codes 2a-2d.

The 2-dimensional code pattern includes the rectangular portions respectively defined by the code frames (H1, H2, H3- - -, V1, V2, V3- - -) in which two or more dots 22 are arranged at a predetermined spacing. The 2-dimensional code pattern contains information expressed by the arrangement of the dots 22 in the regions.

For example, when printing an electronic document stored in a hard disk drive or a floppy disk drive, the 2-dimensional code pattern is printed on the print medium 1 together with the electronic document.

Therefore, by the ink, the toner or the like, which are usually used by the common printer, the 2-dimensional code pattern is superimposed on the document and the 2-dimensional codes are printed.

In FIG. 1, for the sake of explanation, the document itself is not illustrated, and only the 2-dimensional codes are printed in the spacing and the margin of the print medium 1.

Each 2-dimensional code 2 includes the coordinates information indicating the position of the code on paper, and the identification (ID) information of the document page printed with the 2-dimensional code pattern.

The identification information of the document page is a number distinctly correlated with the contents of the document, and the page in which the document is contained.

Such coordinates information and document page ID information are encoded using the dots of the 2-dimensional codes.

In the example of the print medium 1 of FIG. 1, as for the 2-dimensional codes 2a, the information of "horizontal-coordinate=95, vertical-coordinate=10, document page ID=10" is encoded, and the position of the 2-dimensional codes 2a is indicated as being the 95th in the horizontal direction and the 10th in the vertical direction of the document page of ID 10.

Similarly, as for the 2-dimensional codes 2b, 2c, and 2d, the information of "horizontal-coordinate=96, vertical-coordinate=10, document ID=10", the information of "horizontal-coordinate=95, vertical-coordinate=11, document ID=10", and the information of "horizontal-coordinate=96, vertical-coordinate=11, document ID=10" are encoded, respectively.

Thus, the 2-dimensional code pattern is printed on the print medium 1 by defining a fixed region with the code frame by the dots arranged at the predetermined spacing, and giving the positional information of the document page of the code frame, and the identification information of the document page to the center of the code frame. When correcting in the handwriting the print medium, the contents of the drawing information can be correlated with the original document page, and the drawing information can be reflected to the document page. Moreover, the reading of the 2-dimensional codes becomes easy by defining the fixed region with the code frame.

Figure 2:
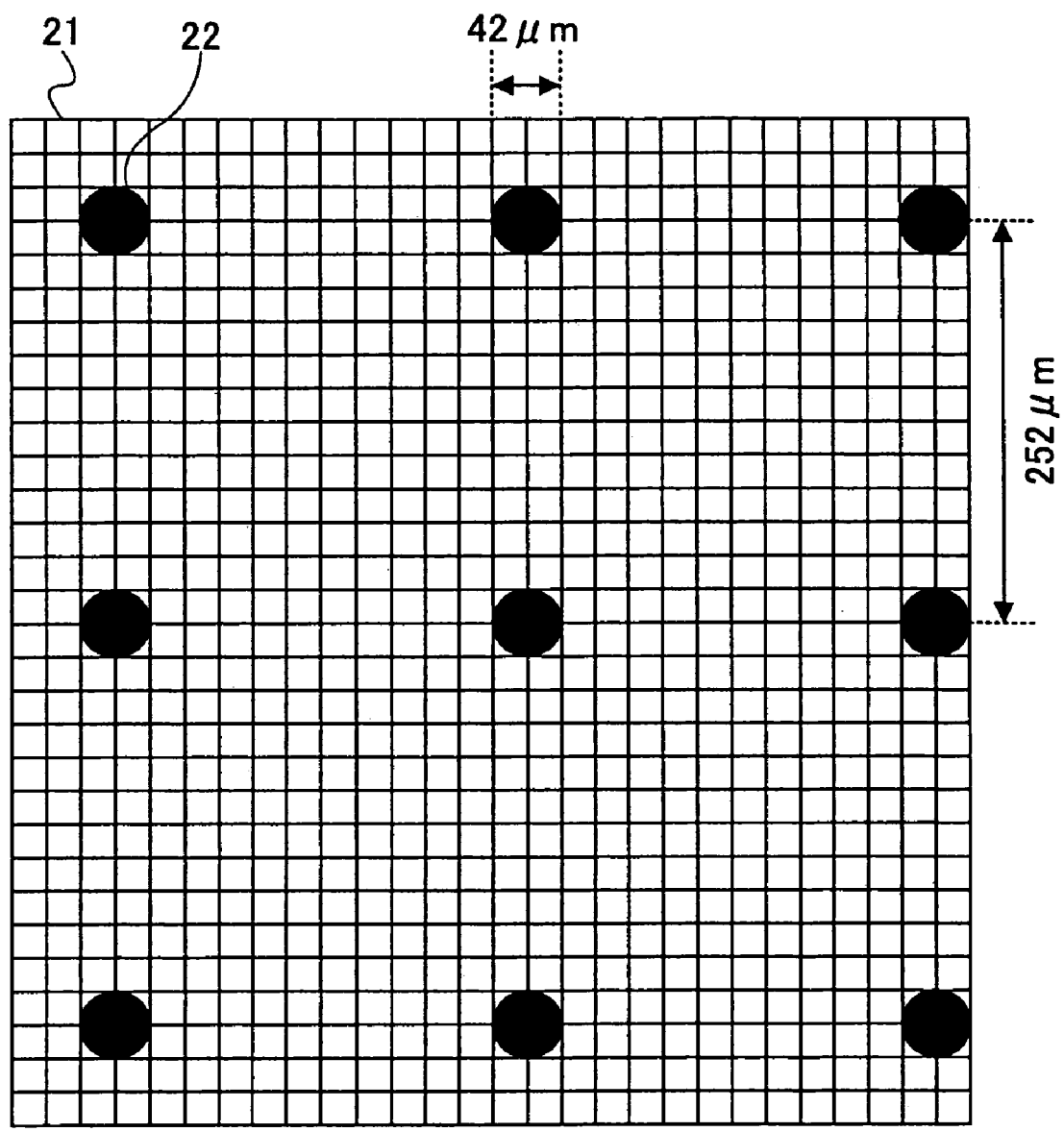
FIG. 2 is a diagram for explaining the dot size and spacing of the 2-dimensional code pattern of FIG. 1.

FIG. 2 is a diagram showing the size and arrangement spacing of the dots 22 which constitute the 2-dimensional code pattern.

In FIG. 2, the square region 21 represents a minimum dot of the printer being used.

Each dot 22 has the size that is equivalent to the size of 2×2 minimum dots 21 of the printer used for printing of both the document and the 2-dimensional code pattern.

For example, in a case of the printer of 1200 dpi, the diameter of the minimum dot is 21 micrometers, and the diameter of the dots 22 which constitute the 2-dimensional code pattern is preferably set to 42 micrometers. Actually, there is a dot gain, and the diameter becomes a little larger.

If the diameter of the dot that is smaller than twice the diameter of the minimum dot of the printer is used, it becomes difficult to be stabilized and to print the dots. Moreover, it is likely to receive the noise at the time of reading of the 2-dimensional codes.

By setting the size of one dot to the size of 2×2 minimum dots of the printer at least, the dot is printed clearly and the location of the dot printed is also stabilized. By using such setup, distinction with the noise becomes easy at the time of 2-dimensional code reading, and the reading error can be reduced.

When the diameter of the dot is set as mentioned above, the spacing of the dots is set to about 6 times of the dot diameter, and the dot arrangement is determined with the spacing in both the horizontal and vertical direction for the 2-dimensional codes.

In the above example of FIG. 2, the dot pitch is set to about 252 micrometers that is equal to 6 times of the dot diameter.

Even when the dots with the size of 2×2 minimum dots of the printer are arranged on the entire paper at intervals that are equal to 6 times of the dot diameter, the area which the dots occupy is 2.8% of the whole paper. If about 50% of the dot gain is expected, the dot share does not reach 5% of the whole paper. Because of this, when the 2-dimensional code pattern is printed with the document using the usual toner, it is only visible to the human eyes as light gray.

Therefore, the problem does not arise that the 2-dimensional code pattern is interfered with the printed document or the characters corrected by the dots, and it is hard to be visible.

When the dots are arranged at a spacing that is larger than mentioned above, the background will become bright, but the reading of the 2-dimensional codes will be difficult.

The 2-dimensional code pattern using such dot size and dot arrangement can be printed on the print medium with the document using the normal printer that is widely used.

Figure 3:
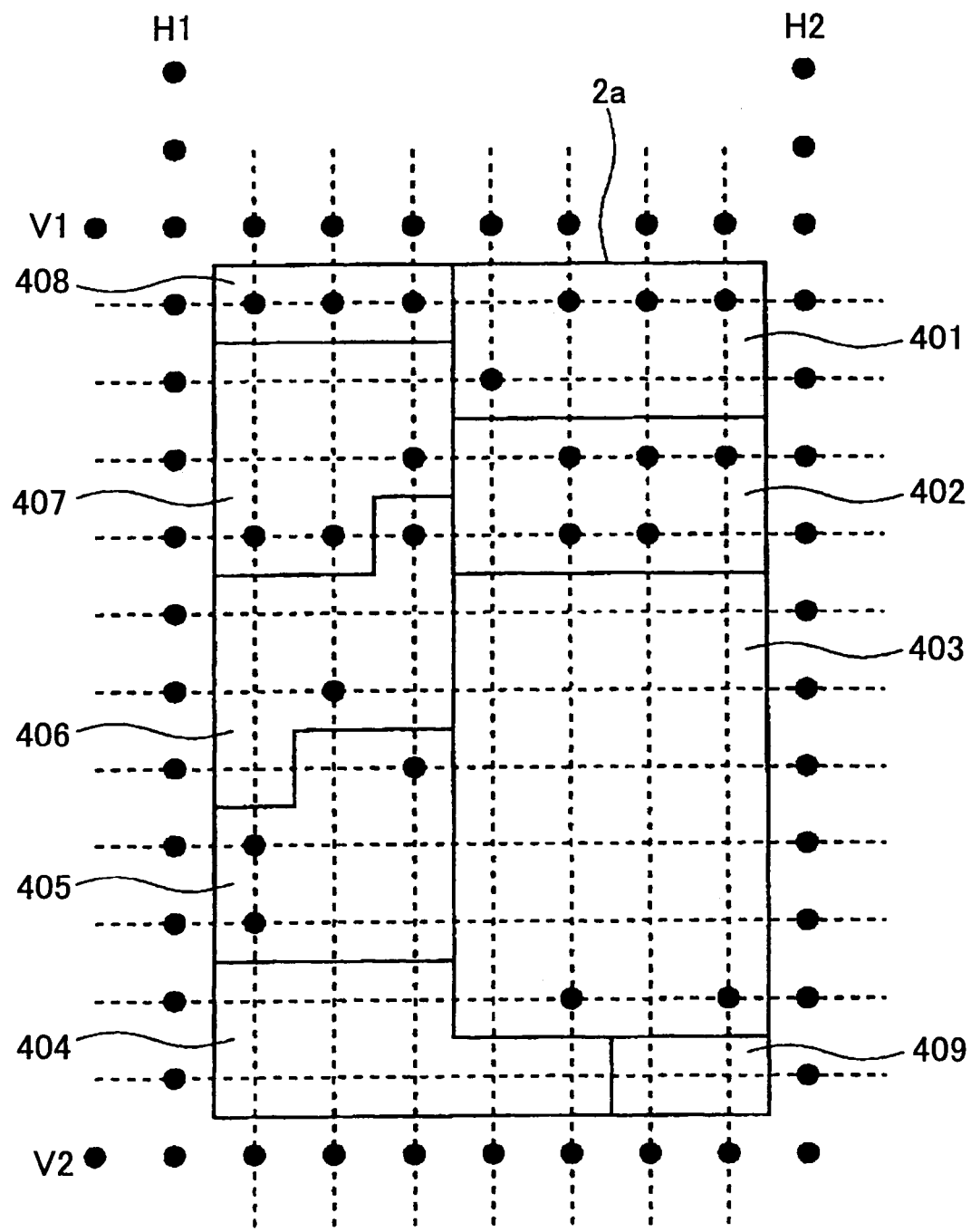
FIG. 3 is a diagram showing an example of the data arrangement regions arranged in the 2-dimensional code.

FIG. 3 shows an example of the data arrangement region (sub region) for including various kinds of information in the 2-dimensional codes 2a.

For the sake of convenience of illustration, the dot pitch is narrowed in FIG. 3. The dot size and the dot pitch of the 2-dimensional codes shown in FIG. 3 are the same as described above with FIG. 2, and the dot pitch is about 6 times the dot diameter.

In the example of FIG. 3, the 2-dimensional codes 2a include the 7×11 cells in the fixed region defined by the dot trains H1, H2, V1 and V2 which constitute the code frame.

The cell means the unit on which the dot is printed, and the size of the 2-dimensional codes 2a with which a maximum of 77 dots can be printed is set to 2 mm×3 mm.

The horizontal coordinate value of 2-dimensional code 2a is 95 and the vertical coordinate value is 10, and when the upper left of printing paper is set to the origin, it will be located in 190 mm position horizontally (right) from the origin and in 30 mm position vertically (lower part) from the origin.

The 2-dimensional code 2a has the vertical indicator code regions 408 and 409 used in order to distinguish the upper and lower sides of the horizontal coordinates region 401 which arranges the data in which horizontal coordinates are shown, the vertical coordinates region 402 which arranges the data showing vertical coordinates, the document ID region 403 which arranges the identifier showing the document page printed, the error correcting code region 404 which arranges error correcting code—the 407 or 2-dimensional code.

In each of these regions, the binary information on "1" or "0" which takes the value is stored by the existence of the dot.

The vertical indicator code regions 408 and 409 have the fixed value, and in order to distinguish the upper and lower sides, the region 408 indicating the upper limit of the code has the dotted pattern of 3×1, and the region 409 indicating the lower limit of the code has the non-dot pattern of 2×1.

Figure 4:
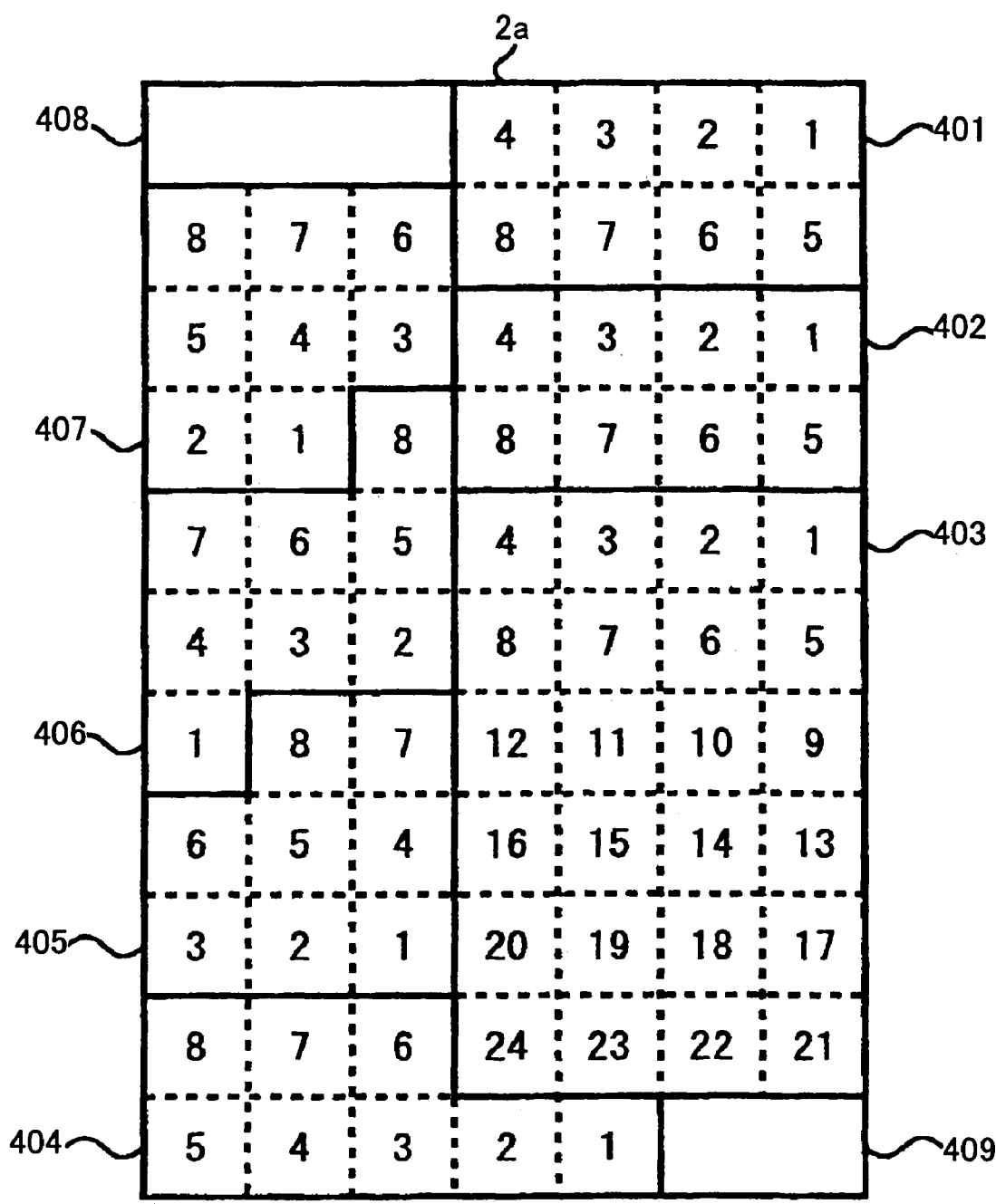
FIG. 4 is a diagram for explaining an example of the bit arrangement in the respective regions of FIG. 3.

FIG. 4 shows a 2-dimensional code 2a of FIG. 3, and shows bit arrangement in each sub region.

The horizontal coordinates region 401 and the vertical coordinates region 402 have the 4×2 cells, respectively, and have the capacity of 8 bits (1 byte). The capacity of 8 bits is enough to show the position (coordinates) of the 2-dimensional code on paper. What is necessary is just to be able to express horizontally the location where the 99 phases differ vertically the 105 phases since the paper of the A4 size is 210 mm×297 mm, supposing it uses the 2 mm×3 mm 2-dimensional code.

Since it is the horizontal of 297 mm, and the vertical of 420 mm in the case of the A3 size, the 140 phases of data are vertically needed the 148 phases horizontally.

Even if it is the A2 size in which it has the size with the horizontal of 420 mm and the vertical of 594 mm, the 210 phases of data are horizontally required and the 198 stages of data are vertically required, and it is settled by the data capacity of 1 byte.

The size of the 2-dimensional code can be determined according to the dimension of the print medium, and can respond horizontal and the data length showing vertical coordinates of the region to the paper of the broad size also by fixation.

The document page ID region 403 has the capacity of the 24 bits (3 bytes).

The error-correction regions 404-407 have the capacity per byte, respectively, and the code for the error corrections included in the 2-dimensional code includes the total of 4 bytes.

Figure 8:
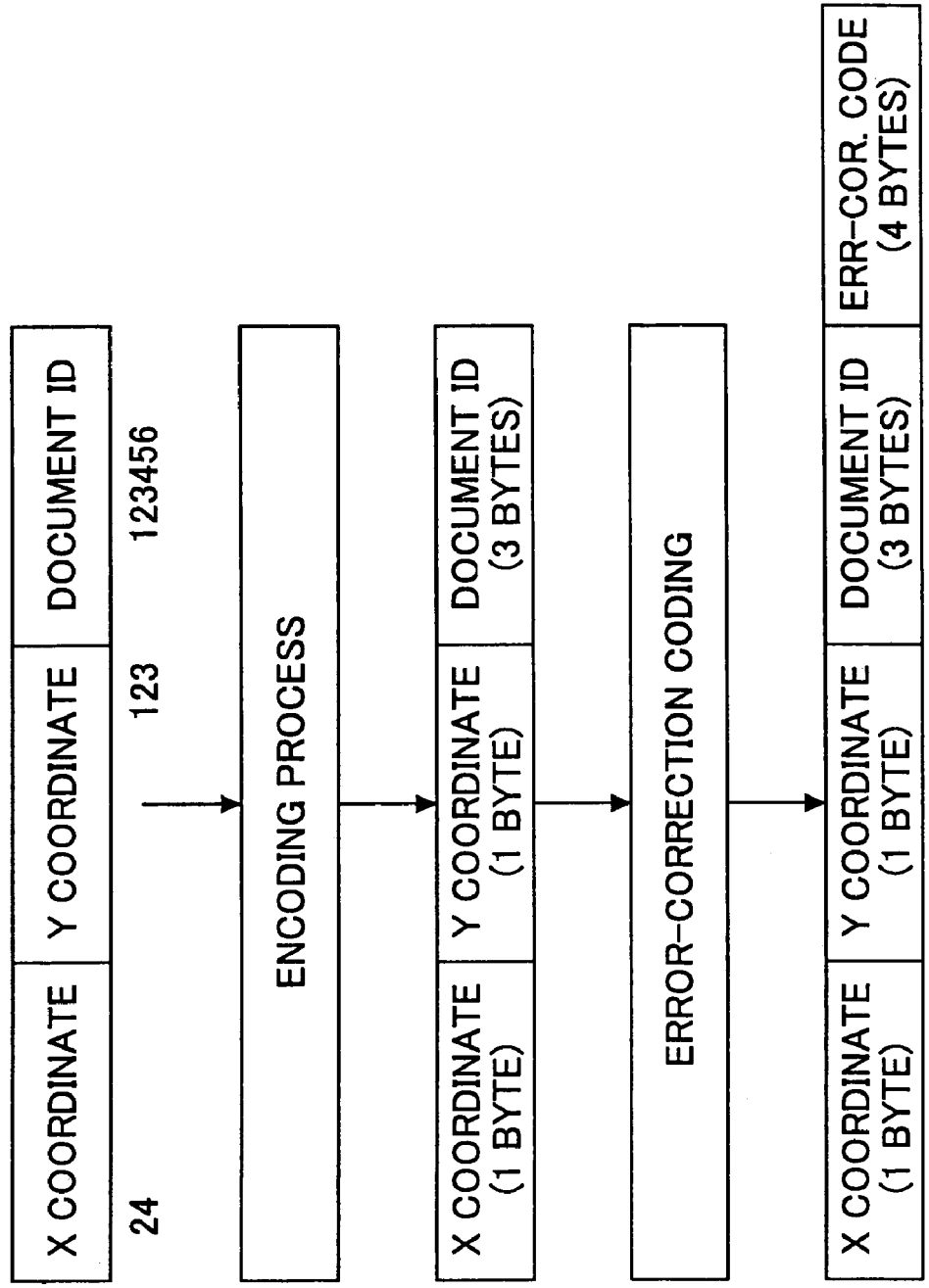
FIG. 8 is a diagram for explaining the coding of data and the addition of error correcting code in the processing flow of FIG. 7.

The numeral character indicated to each sub region shows the bit arrangement. The FIG. 1 in the 8-bit region shows the MSB (most significant bit), and the FIG. 8 shows the LSB (least significant bit).

The code for the error corrections receives the positional information and document ID information on 2-dimensional each the document of the code.

By embedding such error correcting code in the 2-dimensional code, the drawing information can be more correctly acquired.

The 2-dimensional code pattern is printed on the whole paper using usual printing equipment with the document, in case the document stored in the hard drive etc. is printed, as mentioned above.

Figure 5:
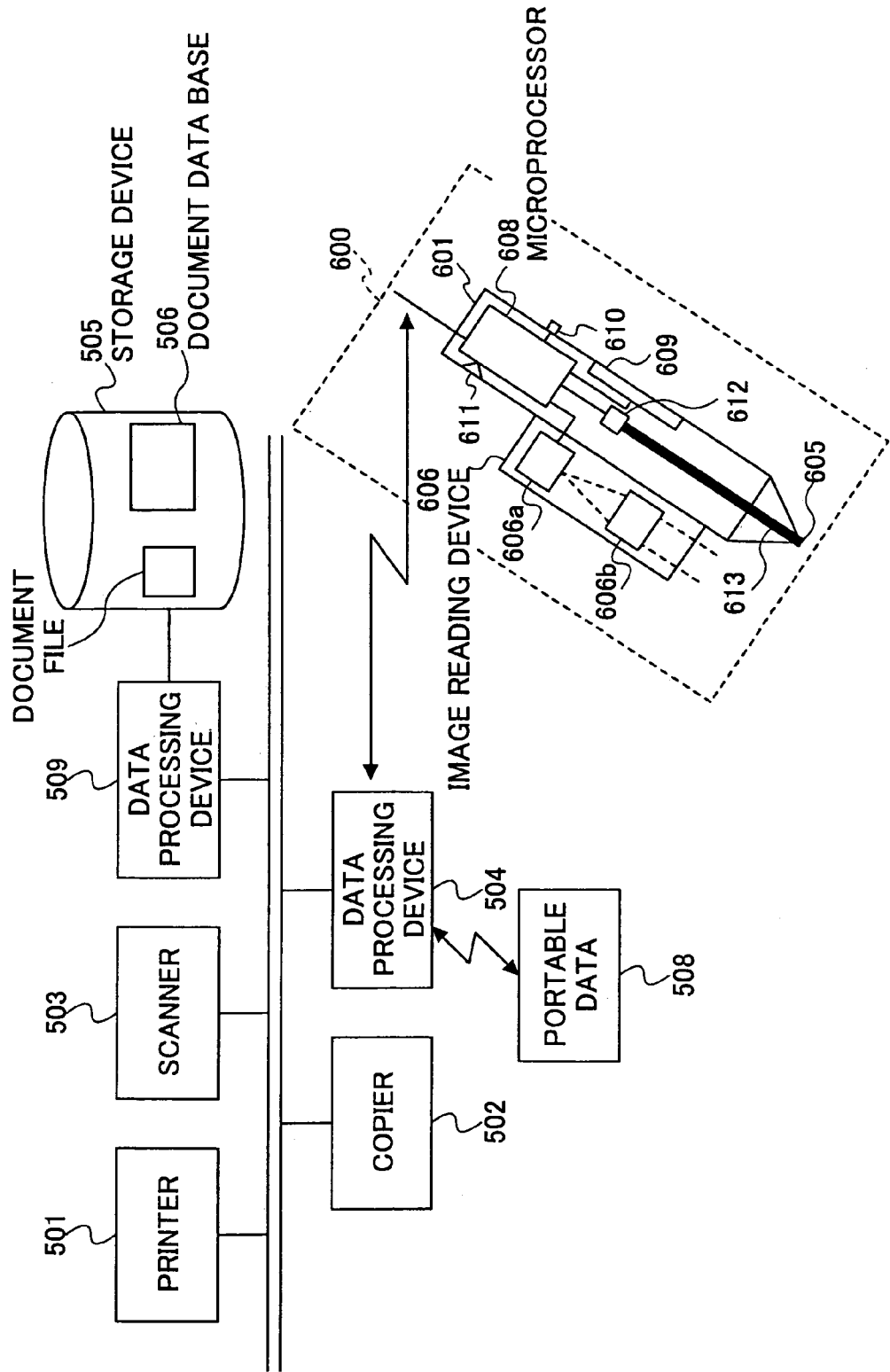
FIG. 5 is a block diagram of a document management system including 2-dimensional code pattern generation and reading to which one preferred embodiment of the present invention is applied.

FIG. 5 shows an example of the document-management system which prints the document with the 2-dimensional code, and corrects the printed document, correlates the drawing information with the original document information, and stores and manages it.

The document-management system includes a first portion which generates and prints the 2-dimensional code pattern, and a second portion which reads the drawing information to the printed document, correlates the same with the original document information, and stores and manages it.

Specifically, the document-management system includes the pen type coordinates input unit 600 connected with the information processing device 509 which performs processing of documentation and the printing command and generation of the 2-dimensional code pattern, the storage 505 which stores the document and is managed, the printer 501 which prints the document page according to the printing command which the information processing device emits, and the document information while correcting to the printed document, even if it reads the positional information of drawing.

When the necessity arises, the document-management system may includes the scanner 503 which reads the document and the image optically, the copying unit 502 and the drawn-up document, and a Personal Digital Assistant 508 which transmits the printing command to the information processing device 504 by radio communication.

Figure 6:
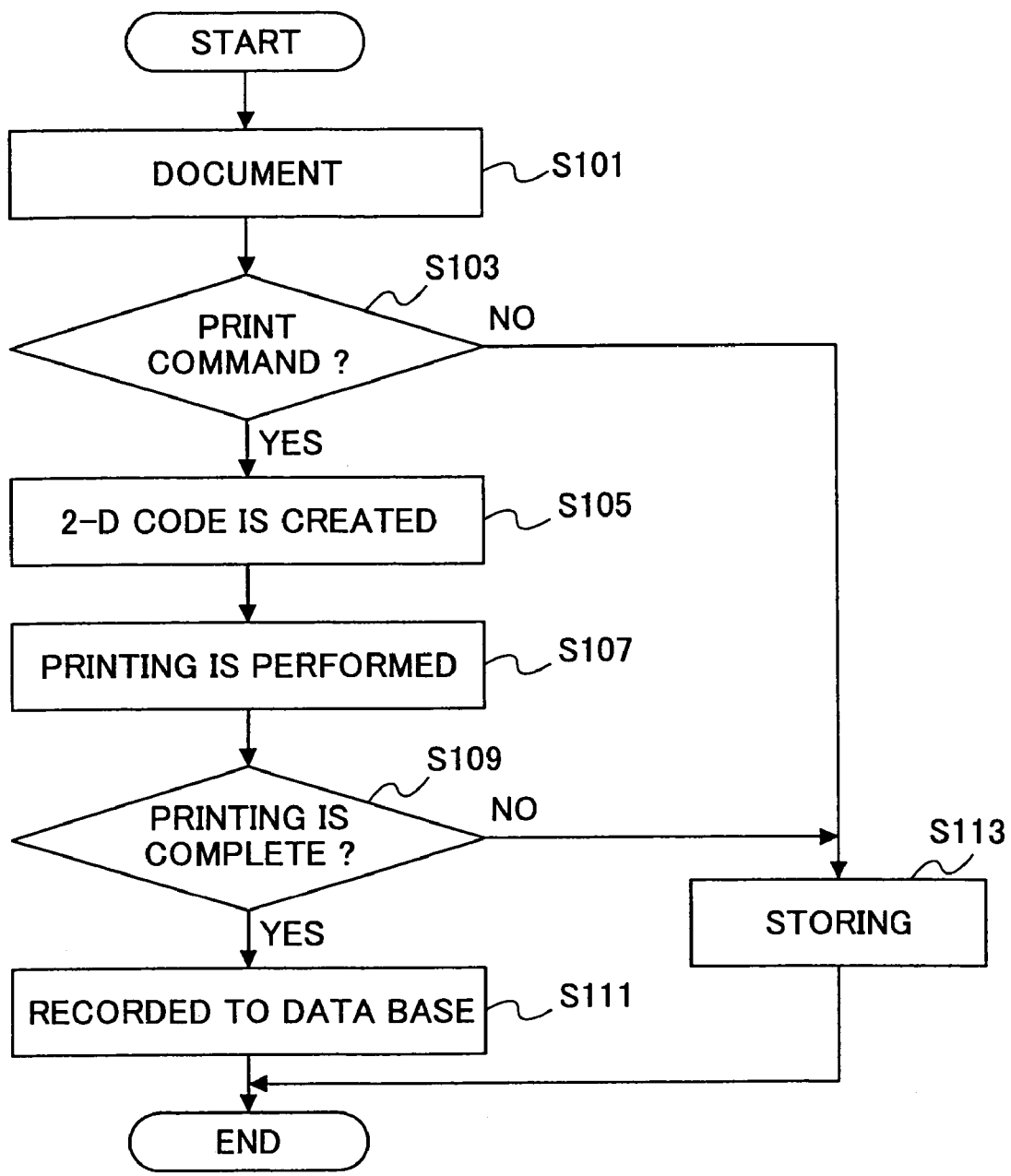
FIG. 6 is a flowchart for explaining operation of a printer driver installed in a data processing device in the document management system of FIG. 5.

FIG. 6 is a flowchart for explaining operation of the first portion of the document-management system of FIG. 5.

At step S101, the text file stored in the storage device 505 is read and edited.

At step S103, the information processing device 509 detects the presence of a printing command.

When the presence of the printing command is received (the result of the step S103 is affirmative), the 2-dimensional code pattern for the document page being printed is generated at step S105.

At step S107, the 2-dimensional code pattern is superimposed on the document page, and the printing is performed. At step S109, it is determined whether the printing is performed successfully.

When the result of the step S109 is affirmative (the printing is successful), the 2-dimensional code pattern is correlated to the document page, and the 2-dimensional code pattern is stored in the document-management data base 506 at step S111. Then, the process of FIG. 6 is ended.

If the user desires to read the document page and correct the same later, the previously generated 2-dimensional code pattern can be used as it is.

When the presence of a printing command is not detected at step S103, or when the printing is not successful at step S111, the data are stored at step S113. Then, the process of FIG. 6 is ended.

Figure 7:
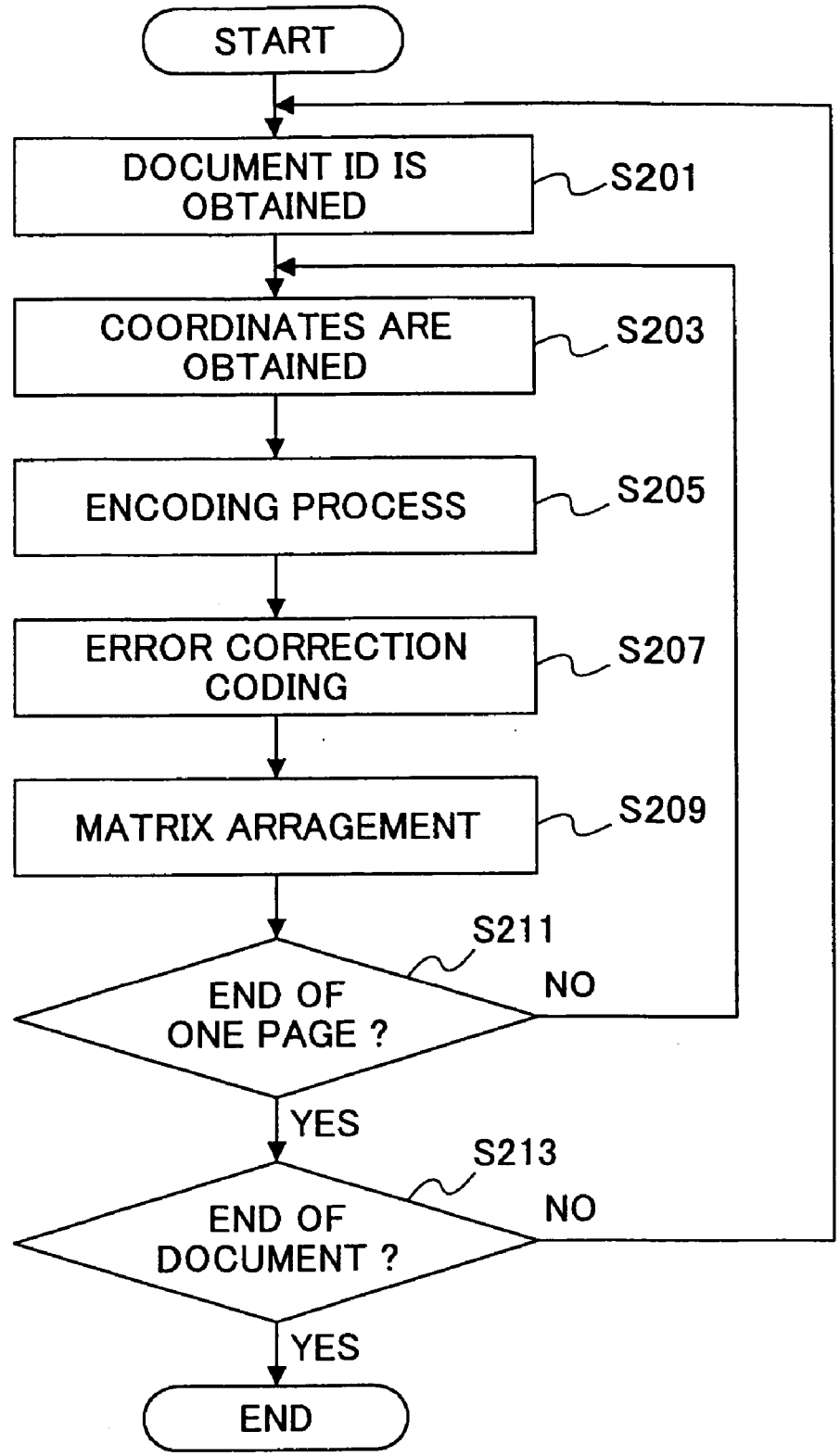
FIG. 7 is a flowchart for explaining operation of a 2-dimensional code generation step in the flowchart of FIG. 6.

FIG. 7 is a flowchart for explaining operation of the step S105 (2-dimensional code generation step) of FIG. 6.

The generation of the 2-dimensional code pattern is performed with the printer driver (not shown) in the information processing device 509.

At step S201, the printer driver acquires the document page ID for every page of the document being printed. This is performed by requesting the document page ID to the document-management data base 506 in the storage device 505.

When writing and printing a new document, it is desirable to store the document page ID of the document in the storage device 505, in order to acquire the document page ID of the document (for example, ID 123456).

When the document page ID is acquired, the coordinates data of each 2-dimensional code 2 embedded in the document page is acquired at step S203.

The coordinates information expresses the position of the upper left corner of the 2-dimensional code 2 as a distance (in mm) from the origin of the document (upper left corner of paper).

Suppose that the coordinates information of a certain 2-dimensional code 2 is sets to (24 mm, 123 mm). In case where the 2-dimensional codes 2 of 2 mm×3 mm are generated, the coordinates information indicates the 12th position from the left of the 2-dimensional code matrix and the 41st position from the top thereof.

At step 205, the encoding of the acquired information is performed so that the document page ID and the coordinates information which are acquired are stored in the sub regions 401, 402, and 403 of the 2-dimensional codes 2.

The document page ID is converted into a binary value of 3 bytes from the six-digit ID number.

The coordinates information, after changing the distance on paper (mm) into the position on the matrix, is converted. Namely, by setting the horizontal-coordinate value to 24 mm/2 mm=12 and by setting the vertical-coordinate value to 123 mm/3 mm=41, the result of the conversion of each of the horizontal coordinate and the vertical coordinate is expressed by one byte.

As shown in FIG. 8, after the encoding is performed, the 3 bytes of the document page ID, and the 1 byte of the X coordinate and the 1 byte of the Y coordinate (or a total of 5 bytes of data) are generated.

Moreover, at step S207, the error correcting code is added to the coded data.

In the 2-dimensional codes 2 of the present embodiment, the 4 bytes of error correcting code regions 404-407 (see FIGS. 3 and 4) are secured, and as shown in the diagram of FIG. 8, the 4 bytes of error correcting code is added.

The reed-solomon code is adopted as error correcting code.

The reed-solomon code is the powerful error correcting system which can correct the error of each byte, and can correct the error below the half of error correcting code length.

About the detail of the reed-solomon error correcting code, "Coding Theory (computer basic lecture 18)" by Miyagawa, Iwadare and Imai collaboration from Shokodo Co., Ltd. and other documents describe the detailed information.

In the present embodiment, the error correcting code length is 4 bytes, and the 2 byte error correction is possible.

Next, at step S209, the coding data and error correcting code data which are generated are assigned to each region of the 2-dimensional code 2, and the 2-dimensional code pattern with which matrix arrangement of the 2-dimensional code 2 is carried out over the whole page is generated.

As shown in FIG. 1, the 2-dimensional each code on the matrix is divided by the code frame (H1, H2, - - -, V1, V2, - - -) prolonged to the horizontal direction and the vertical direction.

At step S211, it is determined whether 1-page processing is completed after the matrix arrangement of step S209.

When the processing for one page of the text file is completed, it is determined whether processing of all the pages of the text file is completed at step S213.

When the processing of the other pages is not yet performed (the result of the step S213 is negative), the control is transferred to the step 201, and a new document page ID of the following page is acquired, and the above steps S203-S211 are repeated.

The process of FIG. 7 is ended when the processing of all the pages is performed (the result of the S213 is affirmative).

Figure 9:
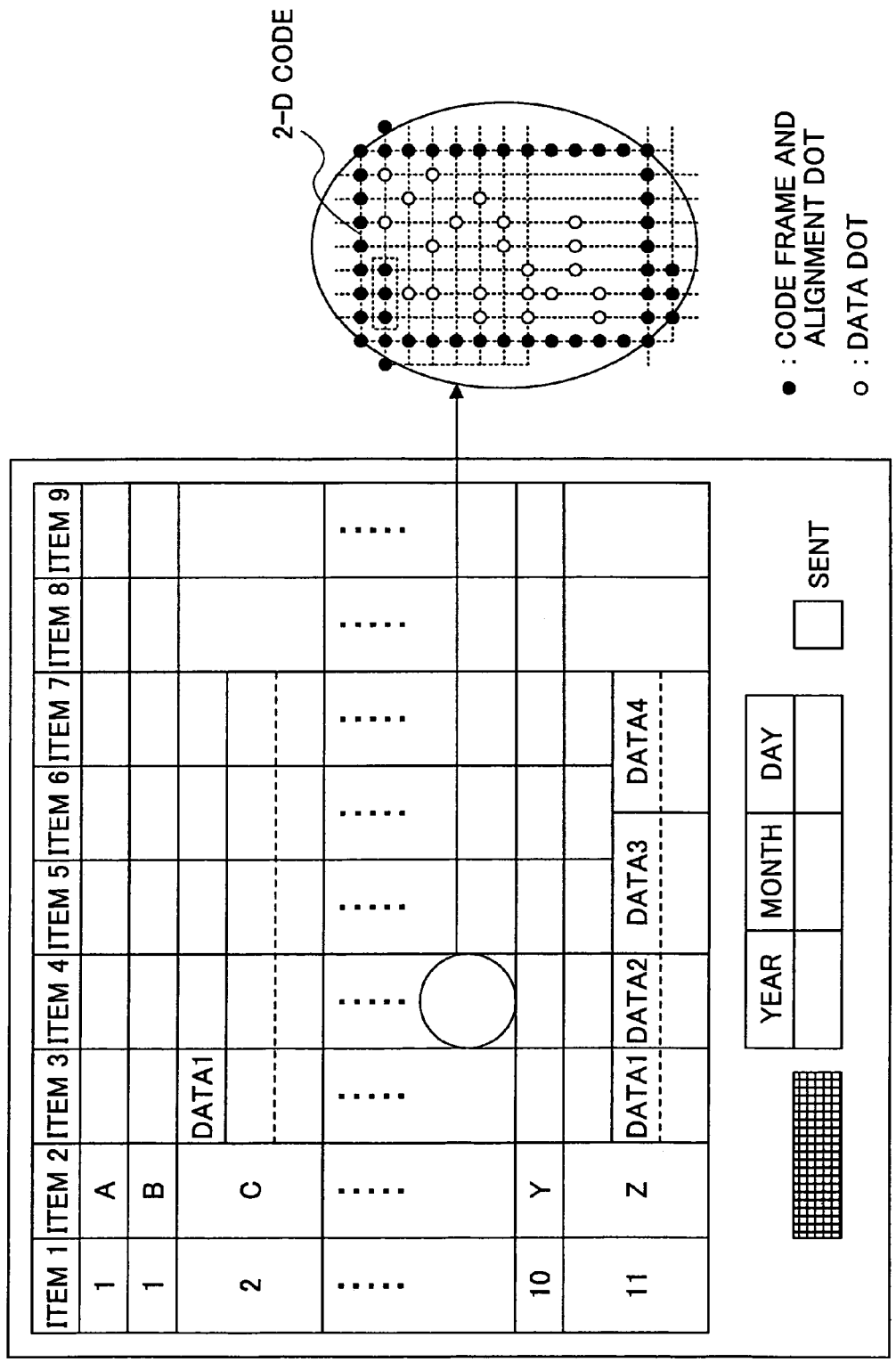
FIG. 9 is a diagram showing an example of the document printed with the 2-dimensional code pattern by the document-management system of FIG. 5.

FIG. 9 shows the example of the document printed with the 2-dimensional code pattern on the print medium.

This document is the list document which has the predetermined format, and the matrix of the 2-dimensional code 2 is printed by the background.

Since the dot size which constitutes the 2-dimensional code pattern, and dot arrangement are set as the size and spacing which are shown in FIG. 2, the 2-dimensional code pattern of the background is only visible to the human eyes as light gray.

The inside of the circle of FIG. 9 is an enlarged view of the spacing or margin part of the printing document, and shows the alignment dots which serve as the code frame of the 2-dimensional codes 2, and the data dots arranged within the limit.

When correcting the document which is printed with the 2-dimensional codes, the pen type coordinates input unit 600 shown in FIG. 5 is used.

The pen type coordinates input unit 600 picks up the 2-dimensional code pattern of the recorded image and the background, carries out the decoding of the read 2-dimensional codes, and, simultaneously with the drawing, acquires the coordinates information of the drawing image.

The pen type coordinates input unit 600 has the image reader 606 formed in the side section of the body 601 of the writing implement configuration where the user can hold in the hand and can perform writing operation, and the body 601.

The writing implement 613 (for example, the ball-point pen or the mechanical pencil) is attached to the tip 605 of the body 601 of the device, and the document printed on the print medium, such as copy paper, can be corrected.

The image reading device 606 has the opto-electric transducer 606a, such as CCD, and the optical system 606b containing the lens, and reads the image on the printing document optically.

Lighting can be formed in the image reading device 606, if needed. In addition, in this preferred embodiment, the reading resolution of CCD is made to the 320×240 pixels. However, the present invention is not limited to this example.

The body 601 of the device includes the microprocessor 608 provided therein. The microprocessor 608 is connected to the image reading device 606. The microprocessor 608 carries out the decoding of the 2-dimensional codes 2 read by the image reading device 606, and detects the coordinates of the 2-dimensional codes on the paper.

The information processing device 504, such as a PC outside the body of the device 601, may be connected to the microprocessor 608. The output of the data accumulated in the microprocessor 608 to the information processing device 504 is also possible.

In addition, in FIG. 5, the radio or cable interface of the power source, and the microcomputer 608 and the information processing device 504 which supply electric power to the image reading device 606, the microcomputer 608, is not shown.

The LCD 609, the LED 610, the buzzer 611, etc. are connected to the microprocessor 608, and the information received from the information processing device 504 is displayed on the LCD 609.

When specific information is received, it is possible to blink the LED 610, or to sound the buzzer 611 and to notify outside.

The body 601 of the device has the pressure sensor 612 which detects whether the point 605 touches the writing side again.

When the point 605 contacts the writing side, the pressure put on the point 605 is transmitted to the pressure sensor 612 through the writing implement 613.

The pressure sensor 612 detects this pressure and transmits the noticed information to the microprocessor 608.

The movement data of the point 605 can be found by detecting the position of the point 605 on the printing document continuously using such a pen type coordinates input unit 600.

Forming the pressure sensor 612 enables the processing of captured images using the image reading device 606 only when writing down on the print medium faithfully.

Since there is no 2-dimensional code which should be read though the document with which the 2-dimensional code is not printed temporarily is corrected with the pen type coordinates input unit 600 of FIG. 5, the position coordinate of drawing is undetectable.

In this case, the LCD 609 or the LED 610 shows the sign by texts or some blinking pattern which means detecting 2D code pattern is impossible.

Figure 10:
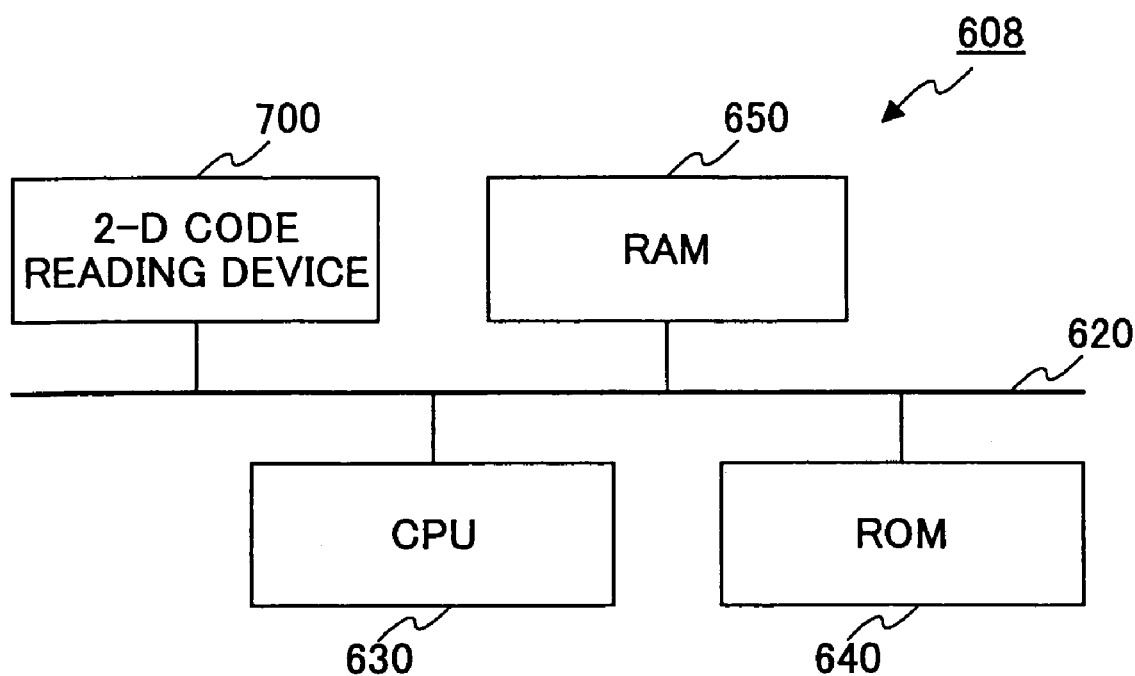
FIG. 10 is a block diagram showing the composition of the microprocessor included in the pen type coordinates input unit shown in FIG. 5.

FIG. 10 shows the internal composition of the microprocessor 608 shown in FIG. 5.

The microprocessor 608 includes the CPU 630, the ROM 640, the RAM 650, and the 2-dimensional code reader 700.

These components are interconnected by the bus 620, and various kinds of external devices are connected through the bus 620.

The program which controls operation of the pen type coordinates input unit 600, and the program which controls operation of the microprocessor 608 are beforehand installed in the CPU 630 or the ROM 640.

The RAM 650 stores temporarily the document page ID and coordinates which are acquired when the decoding of the image read in the image reading device 606, and the intermediate data and the 2-dimensional code which are generated during code reading is carried out.

Figure 11:
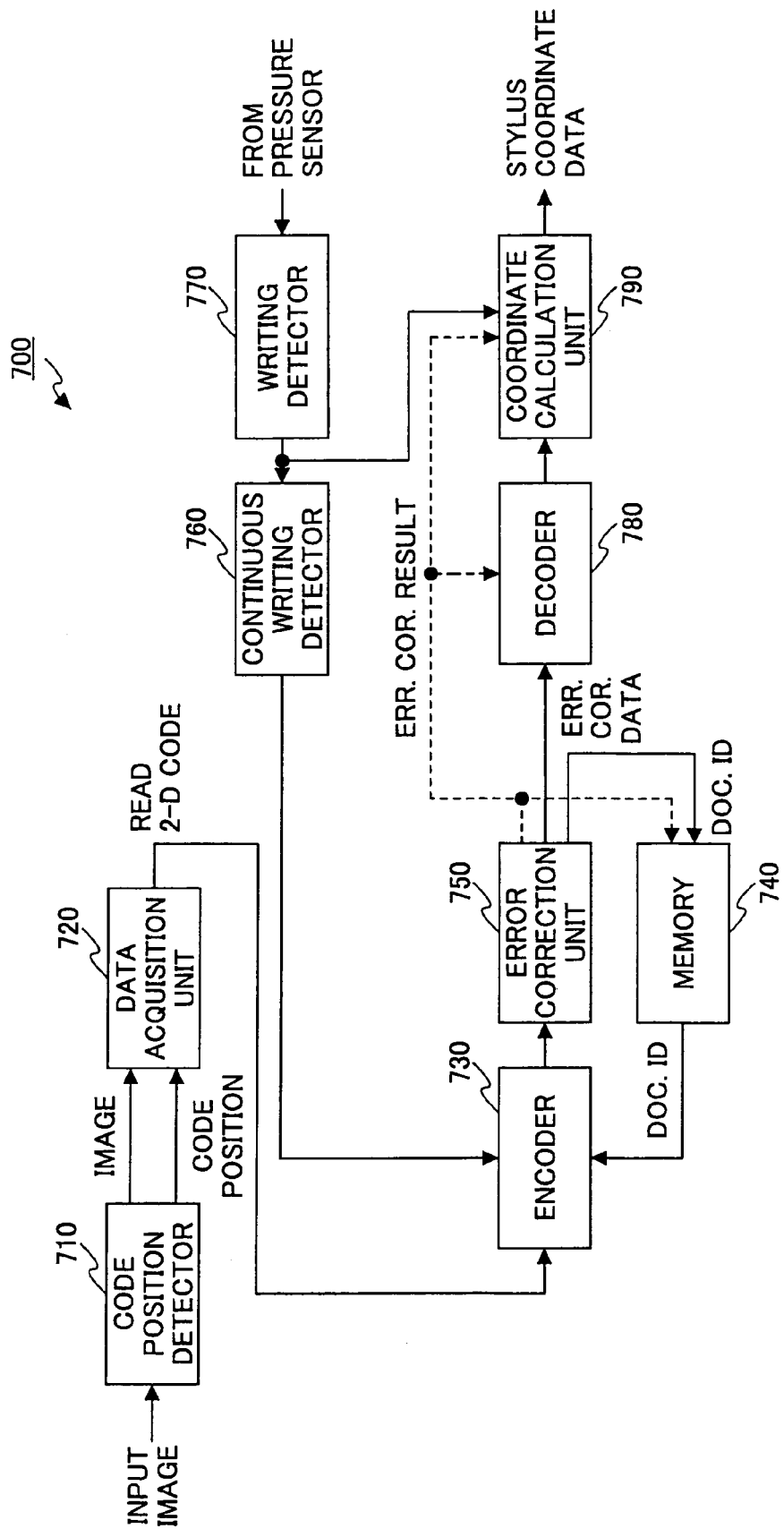
FIG. 11 is a block diagram showing the composition of the 2-dimensional code reading apparatus shown in FIG. 10.

FIG. 11 shows an example of the 2-dimensional code reader 700.

Figure 13:
FIG. 13 is a diagram showing the image of the 2-dimensional code pattern read by the image reading device.

The image (8-bit image) on the print medium read by the image reading device 606 is supplied to the code position detector 710. FIG. 13 shows an example of the image read from the print medium by the image reading device 606.

The image reading device 606 is fixed to the body of the pen type coordinates input unit 600, and reads the 2-dimensional code pattern on the print medium with the distance between the image reading device 606 and the stylus 605 maintained at a fixed distance.

From two or more 2-dimensional codes in the read image, the code position detector 710 detects the frame of one 2-dimensional code, and detects the region of the 2-dimensional code.

The read image is supplied to the data-acquisition unit 720 with the detection region of the 2-dimensional codes.

The data-acquisition unit 720 acquires the data of 0 or 1 according to monochrome cells of the 2-dimensional codes, and rearranges data according to the data arrangement rule and bit arrangement of the 2-dimensional codes (FIG. 4).

The thus read 2-dimensional codes are supplied to the data encoder 730.

On the other hand, the signal outputted from the pressure sensor 612 is inputted into the writing detector 770.

The writing detector 770 detects whether the writing is in progress according to the pressure signal, and outputs the detection result to both the continuous writing detector 760 and the stylus coordinates calculation unit 790.

The continuous writing detector 760 determines that it is the continuous writing when the state of the writing continues over a predetermined time from the output of the writing detector 770. Otherwise the continuous writing detector 760 determines that it is not the continuous writing.

The output of the continuous writing detector 760 is supplied to the data encoder 730.

The data encoder 730 replaces the data read in the image according to the output result of the continuous writing detector 760.

When the output of the continuous writing detector 760 shows under the continuous writing, the data encoder 730 replaces the data of the document page ID of the 2-dimensional code read in the image, with the known document page ID stored in the known-information memory 740, and supplies the resulting data to the error-correction unit 750.

When it is not the continuous writing, the read data are supplied from the data encoder 730 to the error-correction unit 750 as it is, without replacing the document page ID.

The error-correction unit 750 performs the error correction to the output of the data encoder 730.

The objects to which the error correction is carried out are the document page ID and the coordinates information.

The data to which the error correction is carried out are supplied to the data decoder 780.

With the data after the error correction, the error-correction unit 730 outputs the judgment information on whether the error correction is successful, and supplies this judgment information to each of the data decoder 780, the stylus coordinates calculation unit 790 and the known-information memory 740.

When the judgment information indicates the error-correction success, the data decoder 780 starts the decoding of data. When it indicates that the error correction is failure, the data decoder 780 does not operate.

On the other hand, the stylus coordinates calculation unit 790 computes and outputs the stylus coordinates, when the error correction is successful and the output of the writing detector indicates the writing is in progress.

When the error correction is failure or when the writing is not in progress, the coordinates value that does not exist actually (for example, (−1, −1)) is output.

The known information memory 740 stores the part equivalent to the document page ID of the information to which the error correction is carried out, when the error correction is the success.

Figure 12:
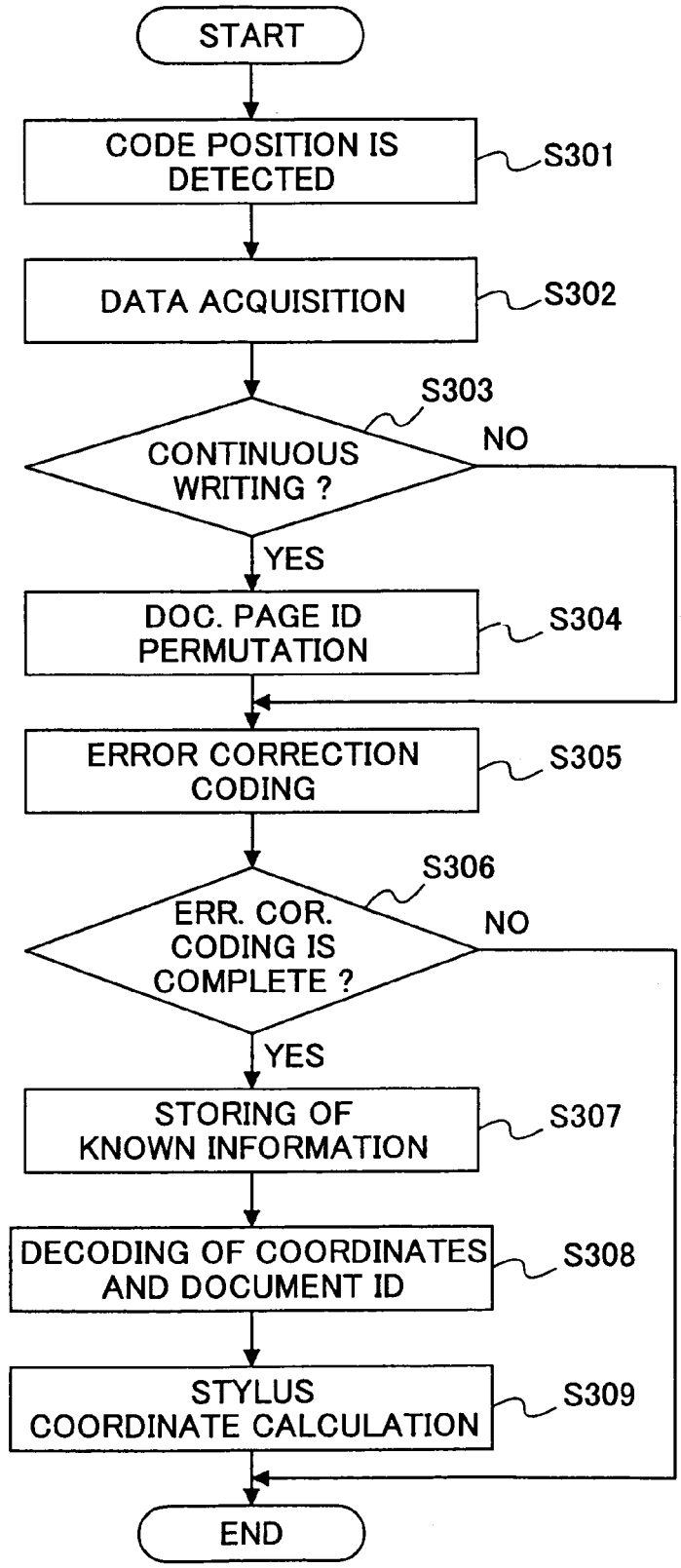
FIG. 12 is a flowchart for explaining operation of the 2-dimensional code reading apparatus of FIG. 11.

FIG. 12 is a flowchart for explaining operation of the 2-dimensional code reader 700 shown in FIG. 11.

In FIG. 12, the operation of the 2-dimensional code reader 700 is essentially the same as that of FIG. 11, and a detailed description thereof will be omitted. Only a brief description of the flow of processing will be given.

At step S301, the region of the 2-dimensional codes is detected. At step S302, the data in the 2-dimensional code region detected at step S301 are acquired. A description of the detection of the 2-dimensional code region and the data acquisition will be given later.

At step S303, it is determined whether the continuous writing is in progress. When the result of the step S303 is affirmative, the document page ID is replaced with the stored document page ID at step S304.

After the data replacement is made, the error correction is performed at step S305. At step S306, it is determined whether the error correction is performed successfully.

When the error correction is successful (the result of the step S306 is affirmative), the document page ID of the corrected data is stored in the memory 740 as the known information at step S307.

After the step S307 is performed, the coordinates data and the document page ID are restored at step S308. The computation of the stylus coordinates information is performed at step S309. Then, the process of FIG. 12 is ended.

Figures 14, 15:
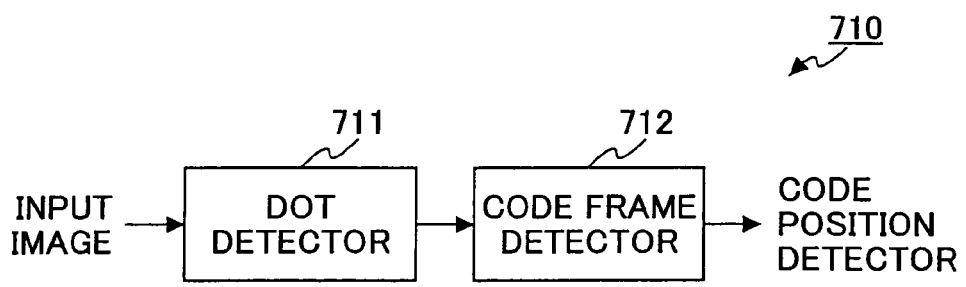
FIG. 14 is a diagram for explaining the data permutation processing by the encoder shown in FIG. 11.
FIG. 15 is a diagram showing the composition of the code position detector shown in FIG. 11.

FIG. 14 shows an example of the data permutation which the data encoder 730 (FIG. 11) performs.

In the example of FIG. 14, the first line is the data with which it is coded at the time of the right data, i.e., 2-dimensional code generation, and error correcting code is added.

The second line is the dot data of the 2-dimensional code which is extracted and is restored from the image which image reading device 606 read at the time of drawing.

From the original value, the error shifted exists in the Y coordinate value of the data restored from the read image, the first of document page ID information, and the second.

The dot is not detected due to the dot displacement or dot blur at the time of printing, or such an error is generated for the reason of having detected the noise as a dot conversely.

In the example of FIG. 14, since there are the three errors in the 3 bytes, which cannot be corrected due to exceeding the ability of the reed-solomon error coding.

However, as long as it is under writing, the error of ID part is canceled by replacing with the document page ID stored as known information, using previously the document page ID read in the image.

As a result, as shown in the third line of the table, the error will remain only in the 1 byte of the Y coordinate.

The error correction of the 2-dimensional code containing the 1 byte of error is appropriately carried out by error correcting code, and the right coordinates information and document page ID information are acquired.

The data which are resulted from the error correction are set to the horizontal-coordinate=24 mm, the vertical coordinate=123 mm, and the document page ID=23 by the data decoder in the example of FIG. 14. In the decoder, the decoding is carried out to the coordinates positions on paper and the document page ID, as mentioned above.

Thus, using the coordinates on the image of the 2-dimensional code which are resulted from the decoding, the stylus coordinates calculation unit 790 (FIG. 11) computes the coordinates of the stylus on paper, and determines the position of the point 605 of the pen type coordinates input unit 600.

FIG. 15 is the outline block diagram showing the composition of the code position detector 710 of FIG. 11.

The code position detector 710 contains the dot detector 711 and the code frame detector 712. The code frame detector 712 determines the 2-dimensional code region by detecting the code frame of the 2-dimensional code from the detected dot by detecting the dot from the image as which the dot detector 711 is inputted from image reading device 606.

Figure 29:
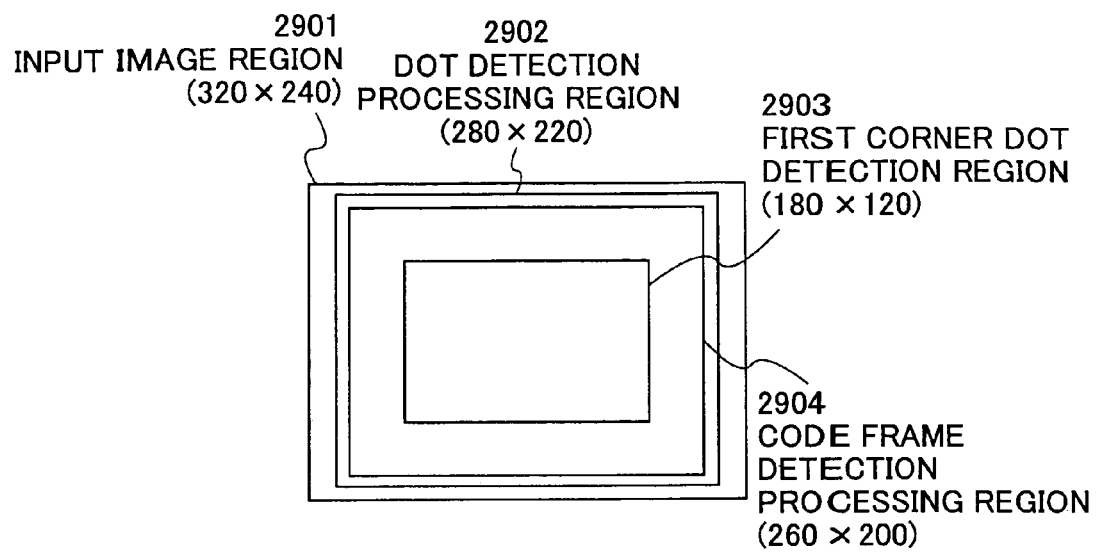
FIG. 29 is a diagram showing the region of the whole input image, and each processing region of the dot detection, the first corner detection, and the corner frame detection.

The region where the dot detector 711 performs dot detection processing is the dot detection processing region 2902 among the regions shown in FIG. 29.

The dot detection processing region 2902 is smaller than the input image region 2901 showing all input images.

When the size of the input image region 2901 is made into the 320×240 pixels corresponding to the reading resolution of CCD, the size of the dot detection processing region 2902 is the 280×220 pixels.

The reason to perform dot detection in the region smaller than the input image region 2901 of the whole pickuped image, is that the image quality at the edge of the region is inferior to the center region. It is difficult to perform the right dot detection in the deteriorated region of the image, and it becomes useless for real processing.

For example, when the holding angle of the pen at the time of drawing inclines greatly, or when the depth of field is limited due to the poor performance of the image pickup optical system, or when vignetting factor known as "tunnel effect" is worse, the edge part of the image fades or it becomes dark.

In this case, degradation of the image quality at the edge of the image becomes large compared with that of the image center, and there is a high probability that the detection of dots as well as corner dots at the edge of the image fails.

In order to eliminate such problems, in this preferred embodiment, the dot detection processing region 2902 which is the processing region of the dot detector 711 is set up to be smaller than the input image region 2901. The input image region 2901 is, for example, the image region which is optically read as shown in FIG. 13, and the dot detection processing region 2902 is the remaining region in which some outer peripheral portions are excluded from the image region of FIG. 13.

Moreover, it is necessary that the frame rate of image capturing on the print medium is such high as between 60 and 100 frames/second, in order for the reproduced image to indicate sufficient smoothness.

When the 2-dimensional code pattern is detected for all the pixels of the image and the detection of the 2-dimensional code pattern ends in failure after the processing of all the pixels, real time processing becomes impossible.

Although it is possible to perform real time processing if a high-speed CPU is used, the practical application is difficult due to the problem of high cost and the shortening of the duration of the battery.

According to the present embodiment, the dot detection processing region 2902 is set up to be smaller than the input image region 2901, and real time processing is possible by using a low-speed CPU.

Figures 16, 17:
FIG. 16 is a diagram for explaining dot detection operation by the dot detector shown in FIG. 15.
FIG. 17 is a diagram showing the relationship between the threshold used by the dot detection operation of FIG. 16 and the rate of coordinates acquisition when the data permutation is performed and when the data permutation is not performed.

FIG. 16 is a diagram for explaining operation of the dot detector 711 shown in FIG. 15.

In the dot detection processing region 2902, the dot detector 711 scans the input image from the left to the right according to the direction of the arrow indicated in FIG. 16, and checks the existence of the dot one by one.

In FIG. 16, one square denotes the pixel of the image reading device 606, and the matrix of pixels corresponds to the light-receiving component arrangement of the CCD array 606a (FIG. 5).

Suppose that the pixels A-D indicated by the shading lines in FIG. 16, among the neighboring pixels around the target pixel Z, are already scanned but the existence of dot is not detected.

In this condition, when the pixel value of the target pixel Z is smaller than the pixel value of any of the neighboring pixels (I-X) separated from the target pixel by one pixel, over a predetermined threshold value (Th), the target pixel Z is detected as one of the dots of the 2-dimensional code.

It is assumed that the pixel value when the input image is black is set to 0 and the pixel value when the input image is white is set to 255. This means that the optical density is high where the pixel value is low.

In the present embodiment, when (1) there is no dot in the neighboring pixels adjoining the target pixel Z, among the already scanned pixels, and (2) the pixel value of the target pixel Z is smaller than a difference between any pixel value of the neighboring pixels separated from the target pixel by one pixel and the threshold value Th (the pixel value of Z<the pixel value of the neighboring pixel−the threshold value Th), the dot detector 711 determines that the dot exists.

When the dot at the pixel Z is detected, the detection of the non-scanned neighboring pixels E, F, G and H is not performed, assuming that the dot is already detected.

The smaller the threshold value (Th) is, the easier it becomes to detect the dot.

However, the noise may also be simultaneously detected as a dot and the error may occur in the detected data.

On the other hand, although the error can be certainly reduced, without detecting the noise if the threshold value Th is large, it is difficult to detect the dot itself, and the rate of coordinates acquisition decreases.

FIG. 17 is a diagram showing the relationship between the threshold value Th used by the dot detection operation of FIG. 16 and the rate of coordinates acquisition when the document page ID permutation is performed and when the document page ID permutation is not performed.

When the threshold value Th is set at 1 or 2, the rate of coordinates acquisition without the permutation is low, but the rate of coordinates acquisition is improved when the document page ID is permuted.

When the threshold value Th is set at 3 or 4, the rate of coordinates acquisition is 75% or higher irrespective of the performance of the permutation. Also, in this case, when the document page ID is permuted, the coordinates can stably be acquired.

When the threshold value Th is set at 7 or 8, the rate of coordinates acquisition is less than 70%. By permuting the document page ID, it is possible to stabilize the rate of coordinates acquisition with a relatively wide range of 1-6 of the threshold value Th value. It is possible to stably detect the coordinates, and the function of the stylus coordinates input unit 600 is stabilized.

Figure 18:
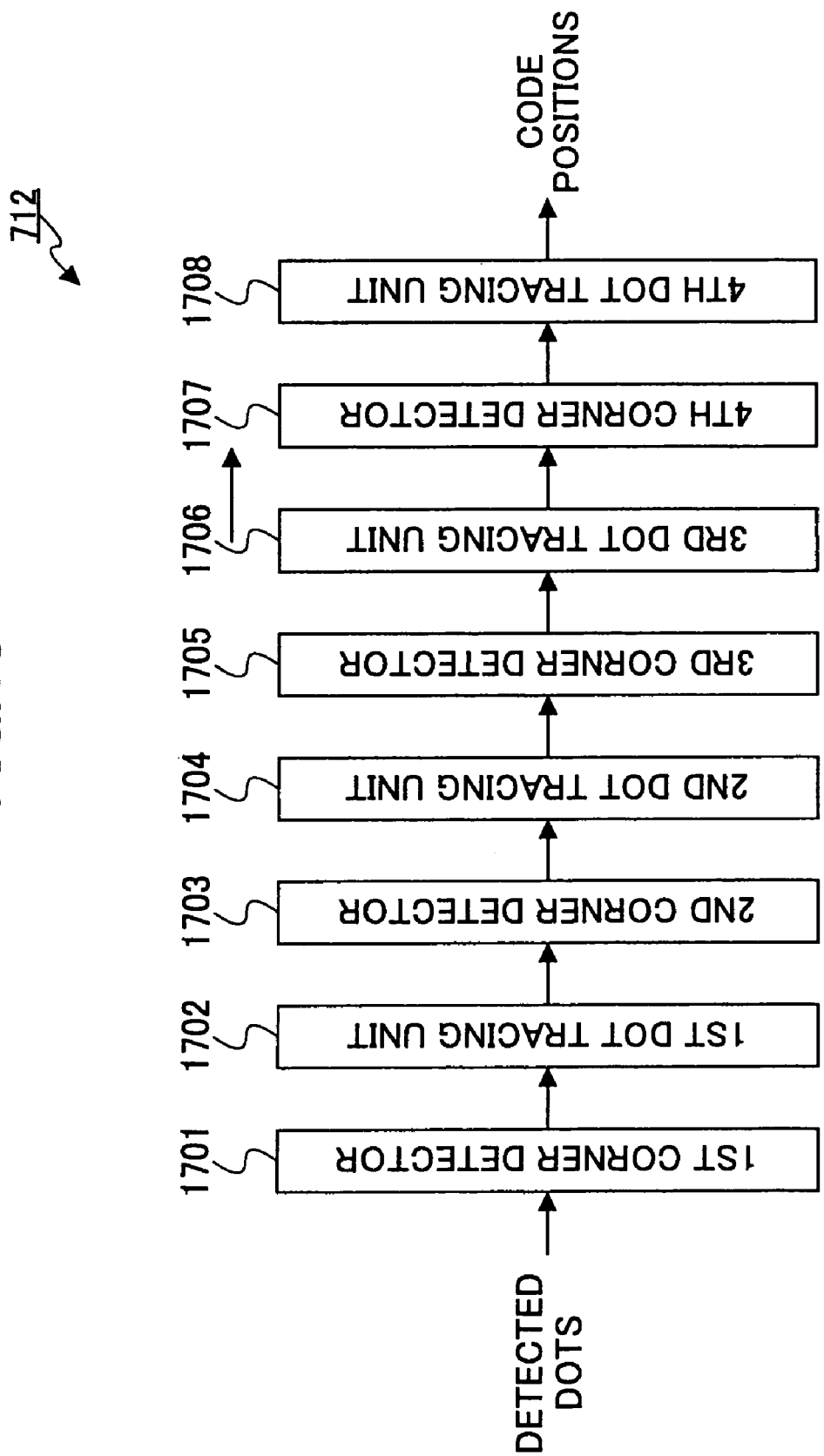
FIG. 18 is a diagram showing the composition of the code frame detector of FIG. 15.

FIG. 18 shows the composition of the code frame detector 712 of FIG. 15.

The code frame detector 712 has four corner detectors and four dot tracing units. After it detects the one corner, by pursuing the dot in the course shown in FIG. 19, it detects the next corner and determines the code frame.

Specifically, the dot detected by the dot detector 711 is inputted into the first corner detector 1701.

The first corner detector determines if a certain dot X is one of the corner dots of the 2-dimensional code.

If the dot X is detected as a corner dot, the first dot tracing unit 1702 will pursue the pixels to find out the eight cells of the 2-dimensional codes (FIG. 1) in each of four directions from the dot X, and will detect the candidate pixels (B and D of FIG. 19) of the second corner.

The second corner detector 1703 determines whether the second corner candidate pixels (B, D) detected by the first-dot tracing unit 1702 are the second corners.

If they are the second corners, the second-dot tracing unit 1704 will pursue the pixels to find out the 12 cells of the 2-dimensional codes in the direction of the clockwise rotation from the second corner, and will detect the third corner candidate pixels (G, E).

Similarly, the third corner detector 1705 determines if the third corner candidate pixels are the third corners, and the third dot-tracing unit 1706 pursues the pixels to find out the eight cells towards the fourth corner in the direction of the clockwise rotation.

The fourth-dot tracing unit 1707 detects the fourth corner candidate pixels (C, A), and the fourth-dot tracing unit 1708 detects dots which constitute the code frame between the fourth corner and the first corner.

With the code frame detector 712, one or two 2-dimensional codes are detected, and the region of the 2-dimensional code in the image can be determined.

The region where pixels X are detected is the first corner dot detection region 2903 which is the innermost region among regions shown in FIG. 29.

The region 2903 is composed of 180×180 pixels, and it has about half the size of the input image region for each dimension.

Figure 30:
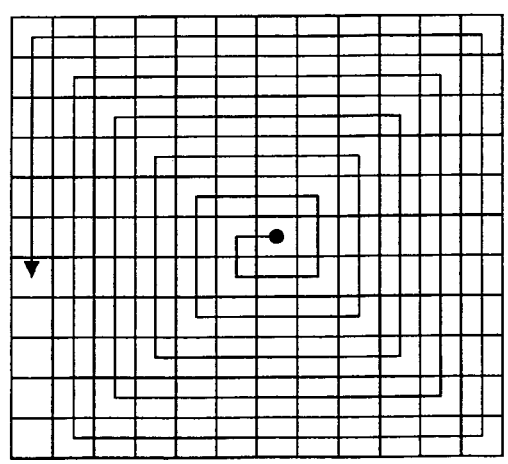
FIG. 30 is a diagram showing an example of the swirl scanning in the first corner dot detection region.

The scanning method by which the dot X is searched for is the swirl scanning, instead of raster scanning. In the case of the swirl scanning, the scanning of the region 2903 is performed in a direction from the center of the region 2903 toward the edge thereof as shown in FIG. 30.

Since the quality of the center of the image is superior to the edge of the image, the probability of the detection of the dot is high.

As described above, the detection of the 2-dimensional codes is started from the image center where the certainty of dot detection is high, and the processing time becomes short, which becomes advantageous to real time processing.

Thus, the first corner dot detection region 2903 is still smaller than the dot detection processing region 2902, and detecting the nearest corner to the center of the image is started.

Figure 20A:
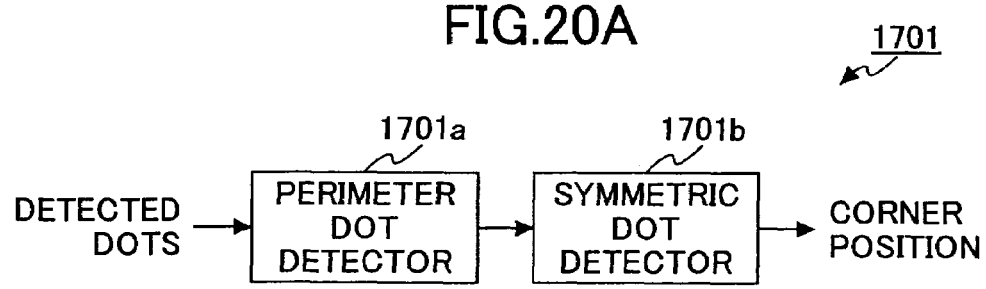
FIG. 20A is a diagram showing the composition of the corner detector of FIG. 18.
Figure 20B:
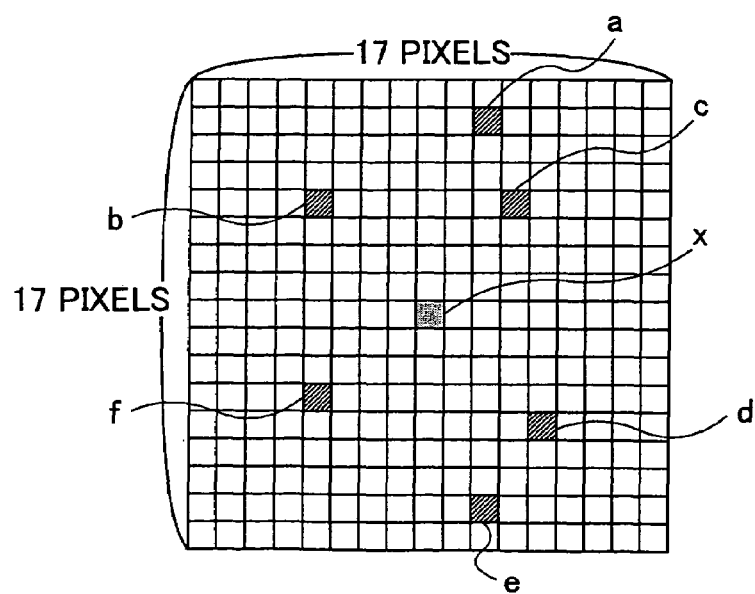
FIG. 20B is a diagram for explaining operation of the corner detector.

FIG. 20A is a block diagram of the first corner detector 1701 of FIG. 18, and FIG. 20B is a diagram for explaining operation of the first corner detector 1701.

Similarly, the second to fourth corner detectors also use the same composition and same operation as the first corner detector 1701, and a description thereof will be omitted.

The first corner detector 1701 includes the perimeter dot detector 1701a and the symmetric dot detector 1701b which receives the output of the perimeter dot detector 1701a which inputs the dot detected by the dot detector 711.

The perimeter dot detector 1701a detects whether the four or more dots existing in the neighborhood of the target pixel X (which is the 17×17 pixels centering on the target pixel X) are detected by the swirl scanning in the region 2903.

The symmetric dot detector 1701b detects 2 sets of symmetric dots with the target pixel X among the detected perimeter dots, since the corner dot is usually accompanied with the neighboring dots located in the cross-shaped type vertically and horizontally.

In the example of FIG. 20B, the perimeter dot detector 1701a will detect the six pixels A-F.

Among the pixels A-F, the 2 sets of pixels (b, d) and (c, f) which distance with the X is small and the middle point of each set is located near the X, are extracted. About the other pixels a and e, they are determined as the noise and removed.

In this manner, the dot X of the target pixel and the 2 sets of symmetric dots in the neighborhood thereof are detected, and it is determined that the target-pixel dot X is the first corner dot.

Figure 21:
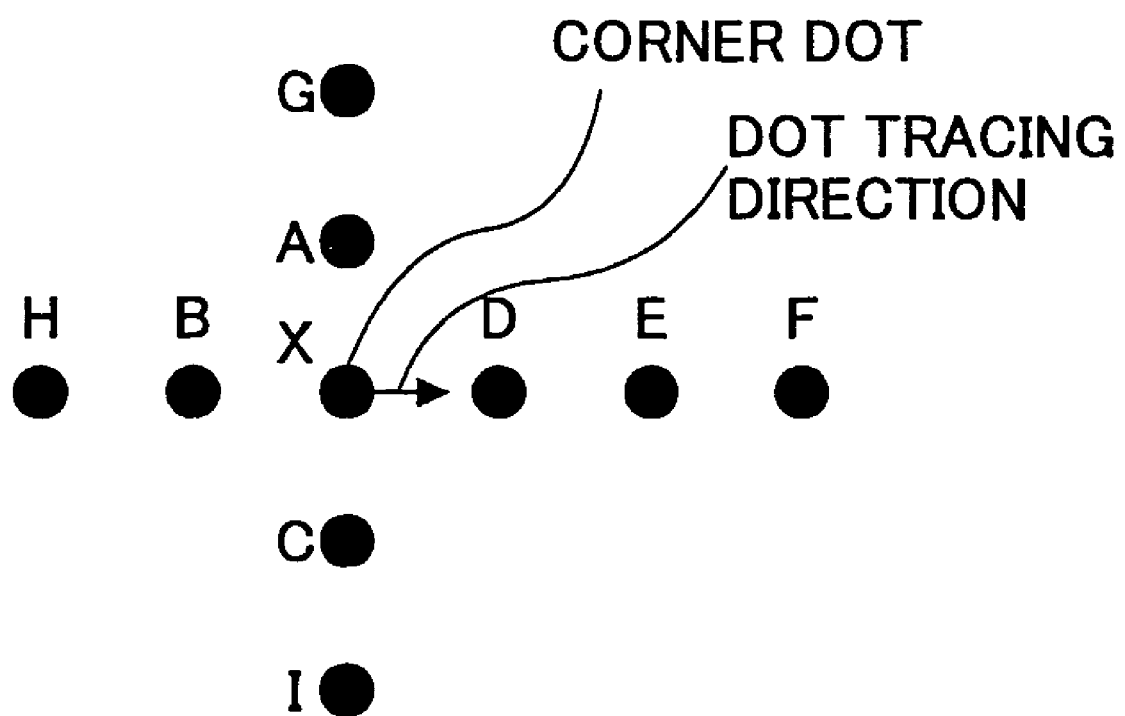
FIG. 21 is a diagram for explaining operation of the dot tracing unit of FIG. 18.

FIG. 21 is a diagram for explaining operation of the dot tracing unit 1702 of FIG. 18.

The dot X is detected as a corner dot by the corner detector 1701. The other dots A-I are arranged from the dot X in the horizontal direction and the vertical direction. It is presumed that these dots are the dots which constitute the code frame.

Since the dot pitch is known when the 2-dimensional codes are generated, the dots D, E and F are pursued from the corner dot X.

The dots A, B, C and D are already detected by the first corner detector 1701 as being 2 sets of symmetric dots. Then, the dot E is pursued.

For the sake of simplification of description, by assuming that the A-I and X dots are coordinates vectors respectively, the vector Y is calculated in accordance with the formula: $Y=2D-X$ where Y is the estimated vector of E.

When the vector Y is computed, it will search for any dot which exists in the 5×5 pixels around the dot of the vector Y. It will be set to the dot E if the dot exists.

Next, the computation of $Y=2E-D$ is performed. It is supposed that the vector Y is the estimated vector of F.

Similarly, the dot which exists in the 5×5 pixels around the dot of the vector Y is detected, and let the same be the dot F.

This tracing operation is repeated 7 times (the seven cells), and the second corner candidate pixel is detected.

Figure 19:
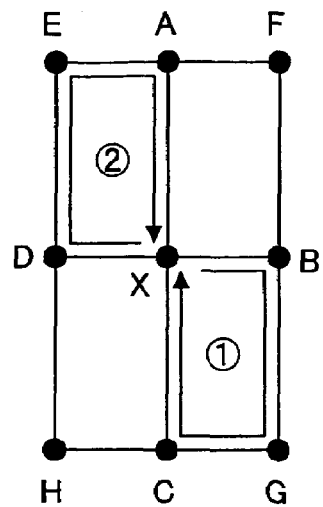
FIG. 19 is a diagram showing the dot tracing course by the code frame detector of FIG. 15.

As the tracing direction is shown in FIG. 19, the four directions (X→A, X→B, X→C, X→D) are recognized, and the information on all the detected second corner candidate pixels is transmitted to the second corner detector 1703 from the dot tracing unit 1702.

The operation of the second corner detector 1703 is essentially the same as that of the first corner detector 1701.

However, a maximum of 4 dots inputted as the target pixel may exist. The second corner dot being detected therein is a maximum of 2 dots (B and D in FIG. 19).

The operation of the second-dot tracing unit 1704 is essentially the same as that of the first-dot tracing unit 1702.

However, the dot with which the tracing is started is the two dots B and D, and the tracing (1) and the tracing (2) are performed for each dot in the direction of the clockwise rotation (both the rotation: B→G and the rotation: D→E in FIG. 19). For each tracing, the dot tracing operation is repeated 11 times (the 11 cells). In this manner, the third corner candidate pixels (G and E in FIG. 19) are detected.

The third corner detector 1705 determines whether the third corner candidate pixels (G and E) which are pursued by the second-dot tracing unit 1704 are actually the third corner. The operation of the third corner detector 1705 is essentially the same as that of the first and second corner detectors.

When the third corner detector 1705 detects the pixels G and E of FIG. 19 as the third corner, the third-dot tracing unit 1706 performs the dot tracing operation in the two directions (both the rotation: G→C and the rotation: E→A in FIG. 19).

Similar to the first-dot tracing unit 1702, the tracing operation is repeated 7 times, and the fourth corner candidate pixels C and A are detected.

Similar to the second-dot tracing unit 1704, the fourth-dot tracing unit 1708 repeats tracing operation by 11 times for each of the direction: C→X and the direction: A→X in FIG. 19, and finally the dot X is reached.

Since the dot X is already detected as the first corner, it means that two code frames are detected by the tracing (1) and the tracing (2) shown in FIG. 19.

The determination as to which code frame is used when performing the decoding of the 2-dimensional codes is made as follows. Namely, the code frame with a large horizontal coordinate is given higher priority.

When the decoding of the 2-dimensional codes cannot be carried out, the decoding of another 2-dimensional code will be carried out.

In addition, the region where the first to fourth dot tracing units perform the dot tracing processing is the code frame detection processing region 2904 among the processing regions of FIG. 29.

The code frame detection processing region 2904 is the region of 260×200 pixels. This region is slightly smaller than the region 2902 where the dot is detected. The determination as to whether the dot is the next corner, is performed by the first to fourth corner detectors after the predetermined number of dots are traced in the predetermined direction. In such a case, the detection of symmetric dots is performed within the region of 17×17 pixels centering on the target dot.

Figure 22A:
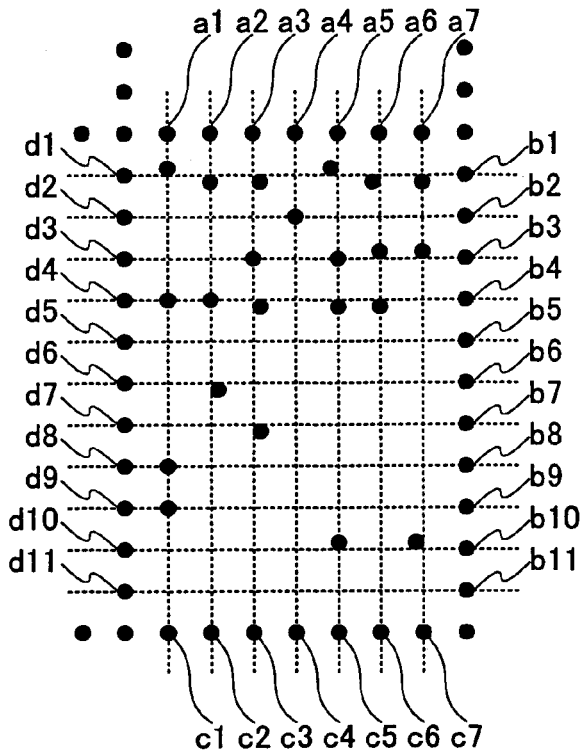
FIG. 22 is a diagram for explaining operation of the data-acquisition unit of FIG. 11.
Figure 22B:
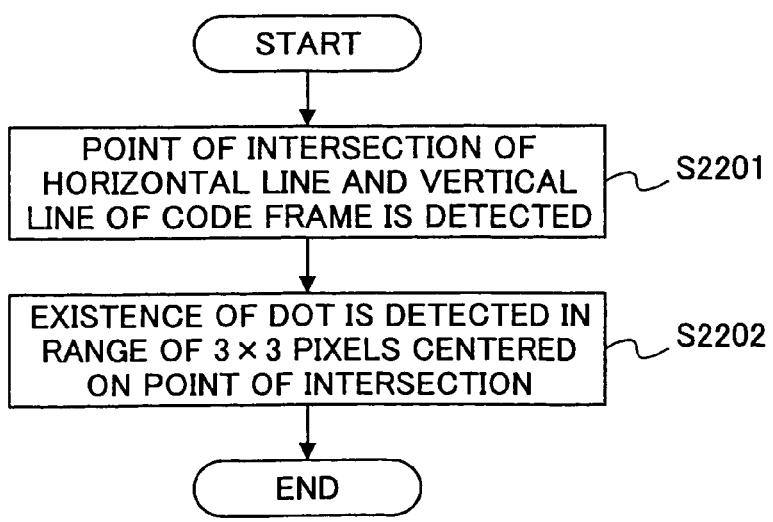

FIG. 22A and FIG. 22B are diagrams for explaining operation of the data-acquisition unit 720 of FIG. 11.

As mentioned above, the data-acquisition unit 720 acquires the coding data embedded in the 2-dimensional code by detecting the dot arrangement inside the code frame.

In FIG. 22A, the dots pursued between the corners among the detected code frames are set to a1-a7, b1-b11, c1-c7 and d1-d11, respectively.

In order to acquire the data of the 2-dimensional code, as shown in step S2201 of FIG. 22B, the intersection between the horizontal line connecting two opposing dots of two vertical code frames and the vertical line connecting two opposing dots of two horizontal code frames is detected one by one.

For example, the intersection between the straight line connecting the two dots a1 and c1 of the vertical code frames and the straight line connecting the two dots b2 and d2 of the horizontal code frames is detected.

Subsequently, at step S2202, the existence of the dot is determined in the region of the 3×3 pixels centering on the point of intersection.

In the example of FIG. 22A, the dot does not exist but the data value acquired is set to "0".

This is performed one by one about the intersection of all the horizontal lines and the vertical lines, and the coordinates information and document ID information on the code which are embedded in the 2-dimensional code are detected.

Furthermore, the error-correction data embedded in the same code are acquired, and the data are reconstructed based on the bit arrangement rule shown in FIG. 4.

For the thus acquired data, when the necessity arises as mentioned above, the document page ID will be permuted by the data encoder 730 (FIG. 11). The error correction is carried out with the error-correction unit 750, and the decoding is carried out by the decoder 789. The data obtained by the decoding are inputted to the stylus coordinates calculation unit 790.

Figure 23:
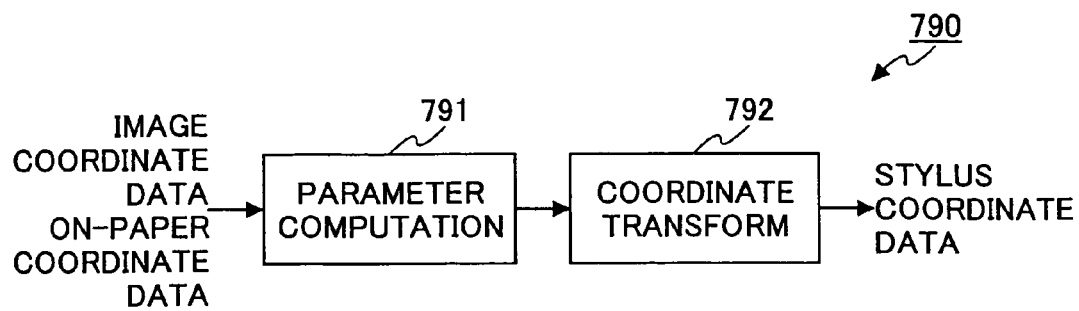
FIG. 23 is a diagram showing the composition of the stylus coordinates detector of FIG. 11.

FIG. 23 shows the composition of the stylus coordinates calculation unit 790 of FIG. 11.

As shown in FIG. 23, the stylus coordinates calculation unit 790 contains the projection parameter calculation unit 791 and the stylus coordinate-transformation unit 792.

The projection parameter calculation unit 791 takes as the inputs the corner coordinates of the 2-dimensional code acquired from the image which is read by the image reading device 606, and the corresponding on-paper corner coordinates of the 2-dimensional code. The projection parameter calculation unit 791 calculates the eight projection (transformation) parameters based on the corner coordinates.

Figure 24:
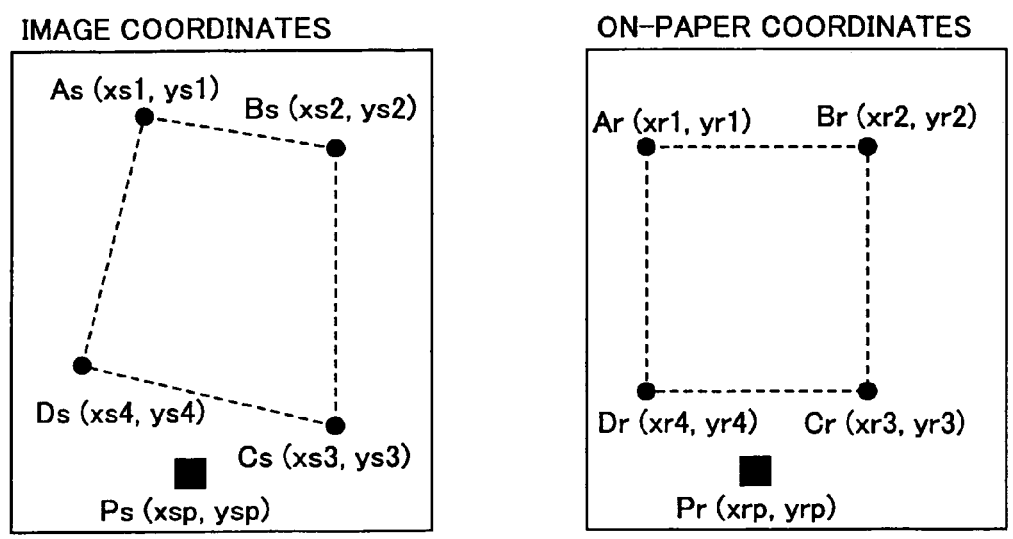
FIG. 24 is a diagram for explaining operation of the stylus coordinates detector.

FIG. 24 is a diagram for explaining the calculation method of the projection (transformation) parameters.

The left figure of FIG. 24 shows the corner coordinates (As-Ds) of the 2-dimensional code obtained from the read image, and the coordinates (Ps) of the point 605 of the pen type coordinates input unit 600.

The absolute coordinates of Ps in the image coordinate system are always fixed. This is because the positional relationship between the image reading device 606 and the point 605 is fixed in the pen type coordinates input unit 600.

Depending on the composition of the pen type coordinates input unit 600, there is a case where the point 605 is in the image region visualized with the image reading device 606, and there is also a case where the point 605 is outside the image region.

In the case where it is outside the image region, the coordinate values are expressed as the negative values, or they exceed the maximum value of the image coordinates.

On the other hand, the right figure of FIG. 24 shows the on-paper corner coordinates (Ar-Dr) of the 2-dimensional code.

What are now needed are the actual coordinates (Pr) of the point 605 of the pen type coordinates input unit 600 on paper. Since the corner coordinates Ar at the upper left corner of the 2-dimensional code on paper are acquired by the decoding of the read 2-dimensional code, the coordinates of the three remaining corners Br, Cr, and Dr can be automatically determined from the dot pitch.

Thus, the conversion factor parameters b1-b8 of the following formula (1) are calculated by solving the eight 1-dimensional equations in which the acquired corner coordinates are substituted to the projective-transformation formula (1).

$$xri=(b1xsi+b2ysi+b3)/(b7xsi+b8ysi+1)$$

$$yri=(b4xsi+b5ysi+b6)/(b7xsi+b8ysi+1) \qquad (1)$$

The stylus coordinate-transformation unit 792 converts the image coordinates Ps into the on-paper coordinates Pr using the conversion factor parameters, and determines the position coordinates of the point 605 on paper.

By acquiring the on-paper coordinates Pr continuously, the contents of drawing to the printing document are acquired. The acquired contents of drawing are superimposed on the electronic data as the basis of the document, and the resulting data are stored in the document-management data base 506 of FIG. 5.

Figure 25:
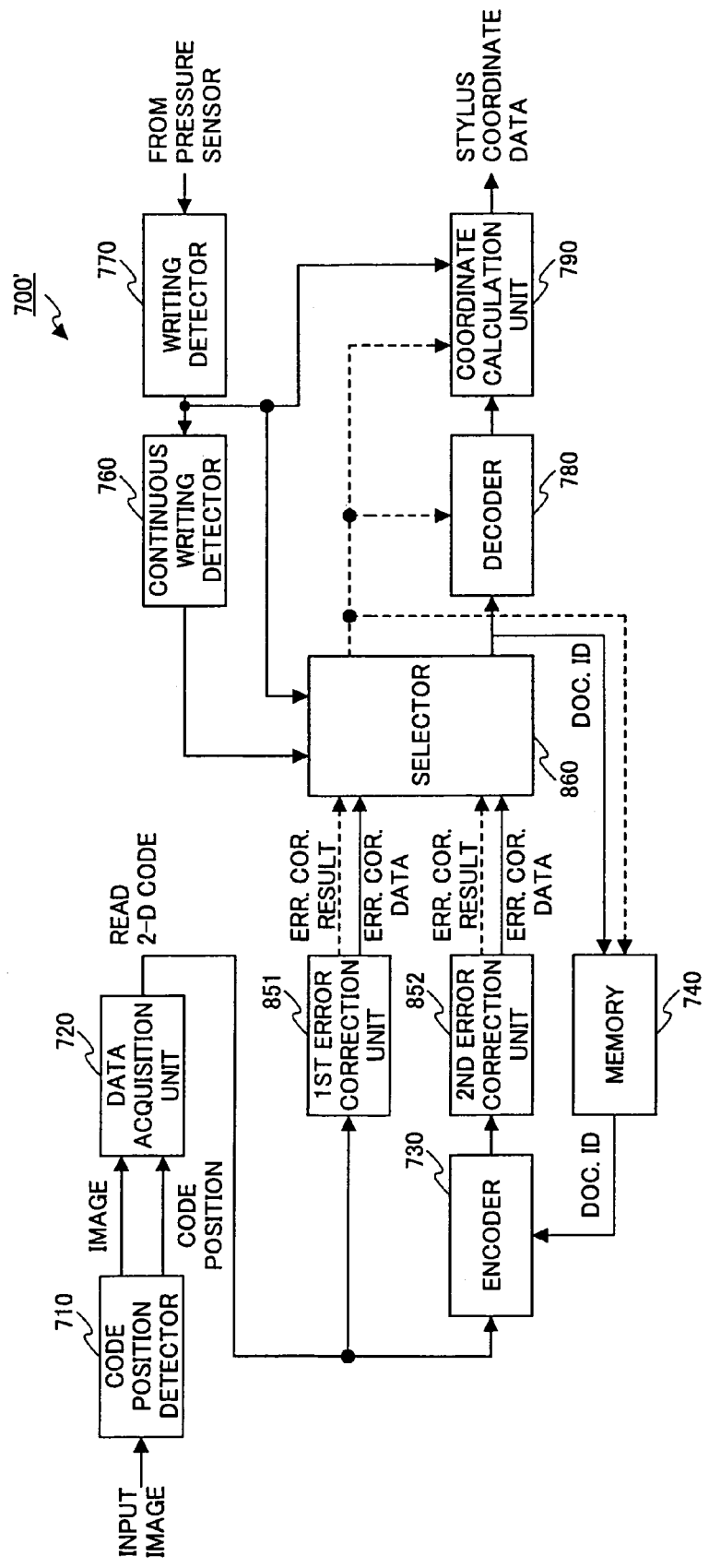
FIG. 25 is a diagram showing the composition of the 2-dimensional code reading apparatus in another preferred embodiment of the present invention.

FIG. 25 shows another preferred embodiment of the 2-dimensional code reading apparatus 700 shown in FIG. 11.

The 2-dimensional code reading apparatus 700 of FIG. 11 determines whether the data encoder 730 permutes the document page ID based on the output of the continuation writing detector 760.

The 2-dimensional code reading apparatus 700' of FIG. 25 is configured to include the first error-correction unit 851 which takes as the input the output of the data-acquisition unit 720 directly, the second error-correction unit 852 which takes as the input the acquisition data passing through the data encoder 730, and the selector 860.

The functions of the first and second error-correction units 851 and 852 are essentially the same as the function of the error-correction unit 750 of FIG. 11, and each error-correction unit outputs the error-correction processing result (which indicates whether the error correction is performed successfully or not) together with the error-correction data, respectively.

The output of the continuation writing detector 760 is connected to an input of the selector 860.

When it is determined by the continuation writing detector 760 that the continuation writing is in progress, the selector 860 always selects the output of the second error-correction unit (namely, the data in which the error correction is performed after passing through the permutation processing of the document page ID). The selector 860 serves to perform the same operation as the 2-dimensional code reading apparatus 700 shown in FIG. 11.

When it is determined that the continuation writing is not in progress but the output of the writing detector 770 indicates the writing (namely, when the error correction of the first error-correction unit 851 is performed unsuccessfully although the selector 860 selects the output of the first error-correction unit 851 preferentially at the time of the start of continuous writing), the selector 860 selects the output of the second error-correction unit 852.

Since the rate of the error correction increases when writing somewhere else of the same document page by adopting the above composition, the present embodiment is advantageous over the 2-dimensional code reading apparatus 700 shown in FIG. 11.

Figure 26:
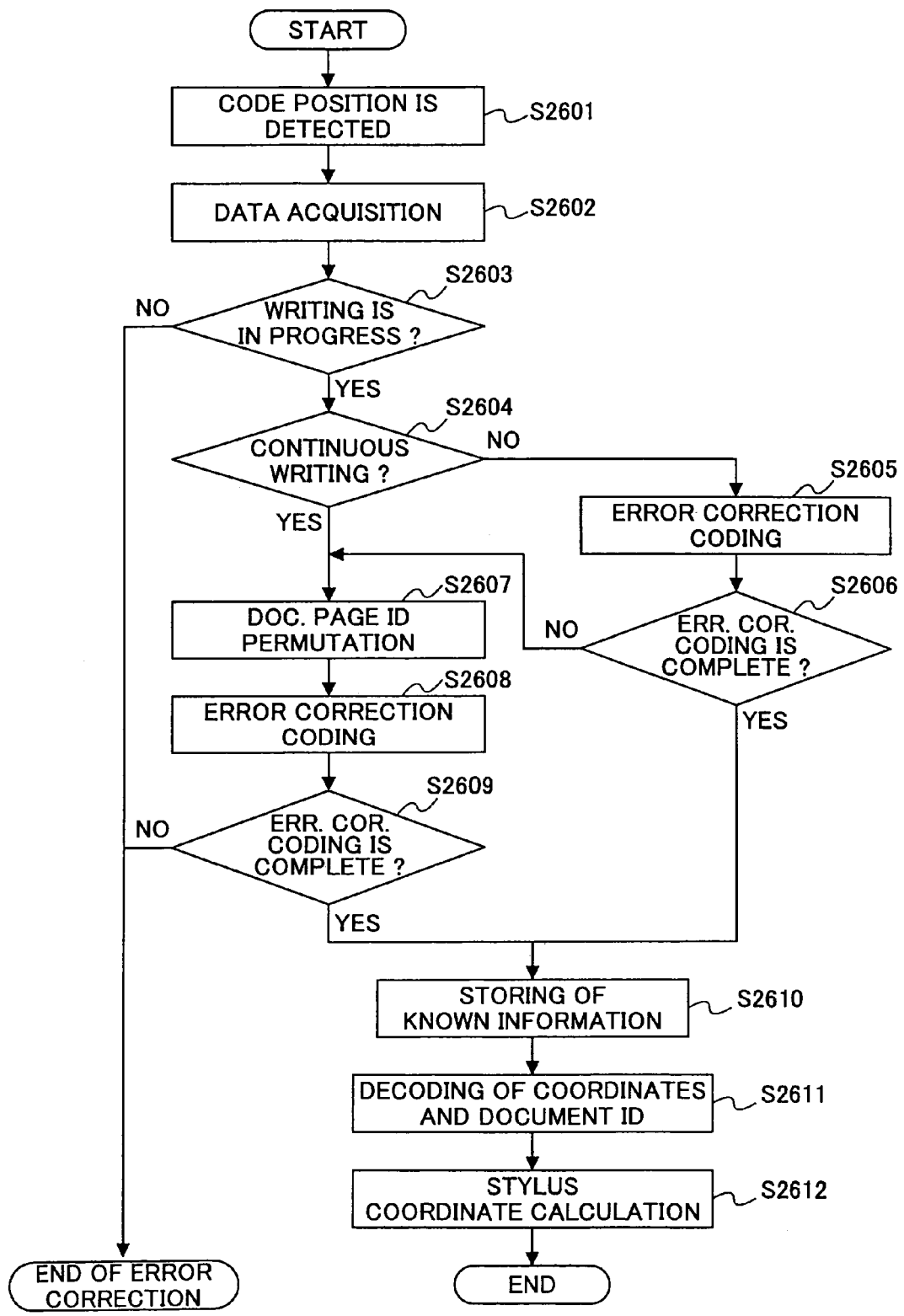
FIG. 26 is a flowchart for explaining operation of the 2-dimensional code reading apparatus of FIG. 25.

FIG. 26 is a flowchart for explaining operation of the 2-dimensional code reading apparatus 700' of FIG. 25.

As shown in FIG. 26, when the image inputted from image reading device 606 is received, the code position detector 710 extracts the position (code frame) of the 2-dimensional code at step S2601.

At step S2602, the data-acquisition unit 720 acquires the data value of "0" or "1" according to the existence of the dot of the 2-dimensional code, and rearranges the bits of the data.

At step S2603, it is determined whether the writing detector 770 indicates that writing is in progress, based on the output state of the pressure sensor.

When the result of the step S2603 is negative, it is not necessary to detect the locus of the stylus, the processing is ended without performing the error correction.

When the result of the step S2603 is affirmative, it is determined at step S2604 whether the continuation writing is in progress. When the result of the S2604 is affirmative, the output of the second error-correction unit 852 is chosen. The document page ID is permuted by the data encoder 730, and the error correction is performed for the resulting data, and the success or failure of the error correction is checked (steps S2607, S2608, and S2609).

When the result of the step S2604 is negative, the output of the first error-correction unit 851 is chosen first. The control is transferred to step S2605, and the error correction is performed at step S2605 without performing the permutation processing. At step S2606, it is determined whether the error correction is performed successfully.

When the error correction is successful, the output of the first error-correction unit 851 is selected as it is.

When the error correction is unsuccessful, the output of the second error-correction unit 852 is selected. The control is transferred to step S2607. At step S2607, the permutation of the document page ID is performed. At step S2608, the error correction is performed. And at step S2609, it is determined whether the result of the error correction is successful.

Even if either of the outputs of the first error-correction unit 851 and the second error-correction unit 852 is selected, when the error correction is performed successfully, the document page ID of the data after the error correction is stored as the known information at step S2610.

After the step S2610 is performed, the decoding of the coordinates information and the document page ID is performed by the data decoder 780 from the error-correction data at step S2611. The on-paper coordinates of the point 605 of the pen type coordinates input unit 600 are calculated by the stylus coordinates calculation unit 790 at step S2612.

Although the 2-dimensional code reading apparatus 700' of FIG. 25 reads the 2-dimensional code by hardware similar to the 2-dimensional code reading apparatus 700 of FIG. 11, it is possible to perform the reading processing by software.

In this case, the program which causes the computer (the CPU 630) to execute the processing shown in the flowcharts of FIG. 12 and FIG. 26 is stored in the ROM 640 (FIG. 10) of the microprocessor 608.

The instruction codes of the program are loaded to the CPU 630, each instruction is executed, and the reading processing of the 2-dimensional code is performed.

Figure 27:
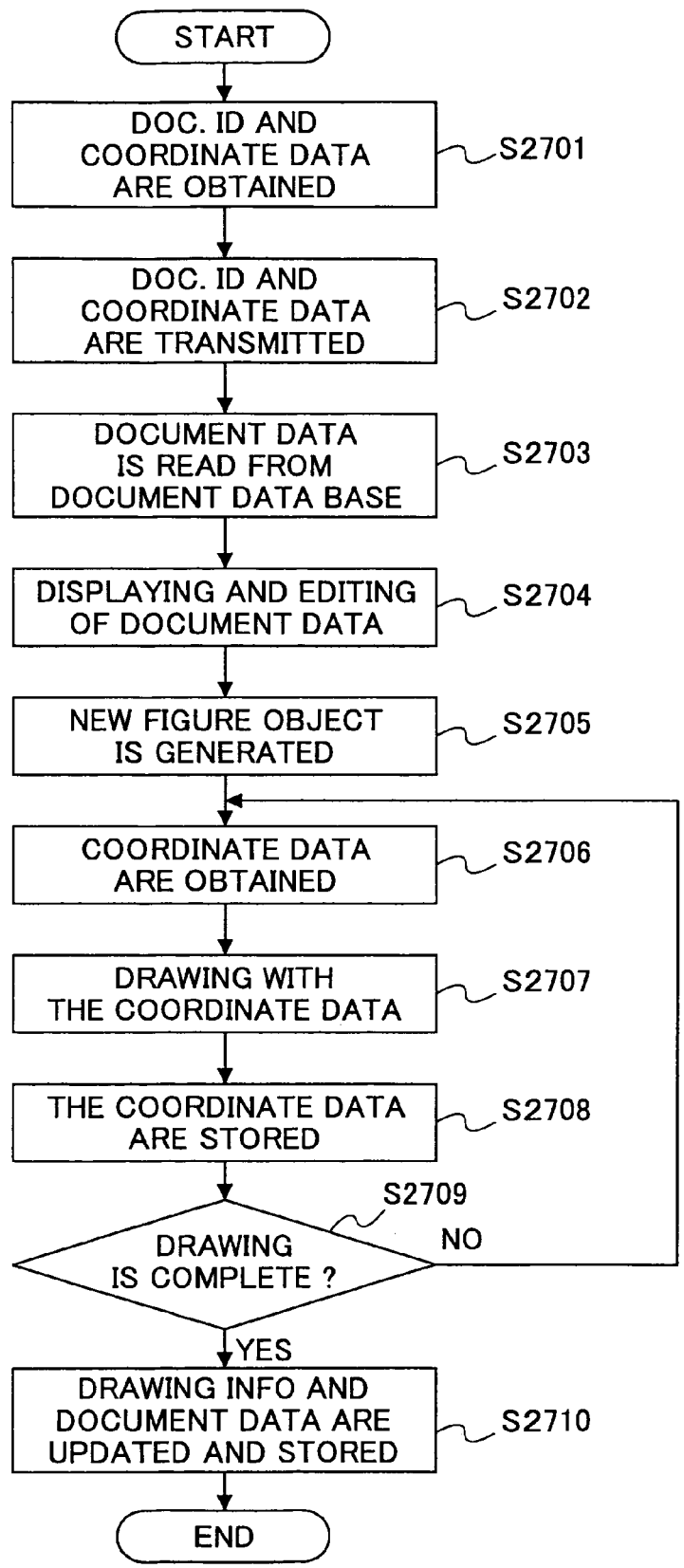
FIG. 27 is a flowchart for explaining the reading of the drawing information and the document management operation after the drawing of the document-management system of FIG. 5.

FIG. 27 shows the processing flow which superimposes on the original document the drawing information read by the 2-dimensional code reading apparatus 700 (or 700').

When the drawing is started with the pen type coordinates input unit 600 to the document printed with the 2-dimensional code pattern, the 2-dimensional code near the drawing part is read at step S2701. As described above, the document page ID and coordinates information are acquired with the 2-dimensional code reading apparatus 700.

The pen type coordinates input unit 600 transmits the document page ID and coordinates information which are read on real time while drawing to the information processing device 504.

At step S2702, the information processing device 504 transmits the document page ID and coordinates information to the information processing device 509 which manages the document-management data base 506, as soon as the document page ID and coordinates information are received.

At step S2703, the information processing device 509 determines the page of the document corrected in the document-management data base 506 based on the received document page ID.

Suppose that the determined document is the first page of "patent.doc" of the identification number (ID) 123456 stored in the data structure shown in FIG. 28.

The determined document information is transmitted to the pen type coordinates input unit 600, and the input unit 600 displays the received document information on the LCD 609.

On the other hand, at step S2704, the information processing device 504 opens the determined file, i.e., the "patent.doc", with the application software (for example, a word processor software) with which the determined file is associated, and displays it on the display (not shown) connected to the information processing device 504. Then, the determined file becomes editable.

The coordinates information transmitted one after another from the pen type coordinates input unit 600 is drawn to the document "patent.doc" in the edit state.

Specifically, the new drawing object is opened to the window of the document, and generation of the new drawing object is enabled (step S2705). From the received data, the coordinates information on the stylus is acquired (step S2706), and the reconstitution of drawing can be realized (step S2707) by connecting the line with the acquired coordinates.

The coordinates information acquired at step S2706 is stored as a predetermined sequence text at the individual file (step S2708).

It is determined whether the drawing is completed at step S2709. When the result of the step S2709 is negative (the drawing is not completed), the steps S2706-S2708 are repeated.

On the other hand, when the drawing is completed (the result of the S2709 is affirmative), the pen type coordinates input unit 600 transmits the signal of the drawing end to the information processing device 504 at step S2710.

The information processing device 504 which received the signal of the drawing end finishes the drawing to the window, updates and stores the document with which the drawing information is added (step S2710).

In this manner, one object corresponding to the document "patent.doc" is added to the document-management data base 506.

According to the above-described composition, it is possible to display on real time the annotated information on the computer display and check immediately whether the information is actually annotated and processed. This is remarkably advantageous for the user.

Moreover, in the information processing device 504, the received stylus coordinates information is simultaneously stored as a sequence text in another file.

For example, when the user wants to open the application file later and to check the recorded data, it is possible to display only the recorded data quickly by storing the drawing information in the sequence text separately.

As described in the foregoing, according to the present invention, using the existing office printer or the existing home-use printer, the 2-dimensional code pattern can be printed with the document page on demand. Moreover, when the document including the 2-dimensional code pattern is corrected continuously, the drawing information can be read correctly according to the 2-dimensional code reading technique of the present invention.

Furthermore, according to the 2-dimensional code reading technique of the present invention, the read drawing information can be made to correlate with the original electronic document, and the drawing information can be reflected into the document. Moreover, by setting up the processing region according to each processing stage, the 2-dimensional code pattern can be read efficiently and real time processing is possible.

The present invention is not limited to the above-described embodiments, and variations and modifications may be made without departing from the scope of the present invention.

What is claimed is:

1. A 2-dimensional code reading apparatus comprising:
a dot detection unit receiving an input image that is formed by optically reading 2-dimensional codes, which are constituted by dots, and detecting the dots from the received input image;
a code frame detection unit configured to detect a code frame from the dots detected by the dot detection unit, the code frame defining a fixed rectangular region by frame dots arranged in a matrix formation at a predetermined spacing in each of two orthogonal directions, said code frame detection unit configured to determine that a target dot is a corner dot of the code frame when four or more neighboring dots which are located around the target dot and are centered on the target dot are detected and two sets of symmetric dots with respect to the target dot are detected among the neighboring dots;
a data decoder configured to read a pattern of the dots arranged within the code frame and configured to decode to reproduce information indicated by the read pattern of the dots,
wherein the dot detection unit is configured to perform the dot detection only for a region smaller than a region of the input image.

2. A 2-dimensional code reading apparatus, comprising:
a dot detection unit configured to receive an input image that is formed by optically reading 2-dimensional codes, which are constituted by dots, and configured to detect the dots from the received input image;
a code frame detection unit configured to detect a code frame from the dots detected by the dot detection unit, the code frame defining a fixed rectangular region by frame dots arranged in a matrix formation at a predetermined spacing in each of two orthogonal directions, said code frame detection unit configured to determine that a target dot is a corner dot of the code frame when four or more neighboring dots which are located around the target dot and are centered on the target dot are detected and two sets of symmetric dots with respect to the target dot are detected among the neighboring dots; and
a data decoder configured to read a pattern of the dots arranged within the code frame and configured to decode to reproduce information indicated by the read pattern of the dots,
wherein the code frame detection unit is provided to determine the code frame by processing of only a region that is smaller than a region of the input image.

3. The 2-dimensional code reading apparatus according to claim 2 wherein the code frame detection performs scanning of only a small region, which is smaller than the region of the input image, in a direction from a center of the small region toward a circumference of the small region.

4. A 2-dimensional code reading apparatus comprising:
a dot detection unit configured to receive an input image that is formed by optically reading 2-dimensional codes, which are constituted by dots, and configured to detect the dots from the received input image, the dot detection unit configured to perform the dot detection only for a first region smaller than a region of the input image;
a code frame detection unit configured to detect a code frame from the dots detected by the dot detection unit, the code frame defining a fixed rectangular region by frame dots arranged in a matrix formation at a predetermined spacing in each of two orthogonal directions, the code frame detection unit configured to determine the code frame by processing of only a second region smaller than the region of the input image, said code frame detection unit configured to determine that a target dot is a corner dot of the code frame when four or more neighboring dots which are located around the target dot and are centered on the target dot are detected and two sets of symmetric dots with respect to the target dot are detected among the neighboring dots; and
a data decoder configured to read a pattern of the dots arranged within the code frame and configured to decode to reproduce information indicated by the read pattern of the dots.

5. The 2-dimensional code reading apparatus according to claim 4 wherein the code frame detection unit performs scanning of only a third region, which is smaller than the second region, in a direction from a center of the third region toward a circumference of the third region.

6. The 2-dimensional code reading apparatus according to claim 4 wherein the second region is set so that the second region is included in the first region.

7. A 2-dimensional code reading method comprising:
receiving an input image that is formed by optically reading 2-dimensional codes which are constituted by dots;
detecting the dots from the received input image, the dot detection being performed only for a region smaller than a region of the input image;
detecting a code frame from the dots detected by the detecting the dots, the code frame defining a fixed rectangular region by frame dots arranged in a matrix formation at a predetermined spacing in each of two orthogonal directions, the detecting a code frame including determining that a target dot is a corner dot of the code frame when four or more neighboring dots which are located around the target dot and are centered on the target dot are detected and two sets of symmetric dots with respect to the target dot are detected among the neighboring dots;
reading a pattern of the dots arranged within the code frame; and
performing decoding to reproduce information indicated by the read pattern of the dots.

8. A 2-dimensional code reading method comprising:
receiving an input image that is formed by optically reading 2-dimensional codes which are constituted by dots;
detecting the dots from the received input image;
detecting a code frame from the dots detected by the detecting the dots, the code frame defining a fixed rectangular region by frame dots arranged in a matrix formation, at a predetermined spacing in each of two orthogonal directions, the code frame detection provided to determine the code frame by processing of only a region that is smaller than a region of the input image, the detecting a code frame including determining that a target dot is a corner dot of the code frame when four or more neighboring dots which are located around the target dot and are centered on the target dot are detected and two sets of symmetric dots with respect to the target dot are detected among the neighboring dots;
reading a pattern of the dots arranged within the code frame; and
performing decoding to reproduce information indicated by the read pattern of the dots.

9. The 2-dimensional code reading method according to claim 8 wherein the detecting a code frame includes performing scanning of only a small region, which is smaller than the region of the input image, in a direction from a center of the small region toward a circumference of the small region.

10. A 2-dimensional code reading method comprising:
- receiving an input image that is formed by optically reading 2-dimensional codes, which are constituted by dots;
- detecting the dots from the received input image, the dot detection being performed only for a first region smaller than a region of the input image;
- detecting a code frame from the dots detected by the detecting the dots, the code frame defining a fixed rectangular region by frame dots arranged in a matrix formation at a predetermined spacing in each of two orthogonal directions, the code frame detection provided to determine the code frame by processing of only a second region smaller than the region of the input image, the detecting a code frame including determining that a target dot is a corner dot of the code frame when four or more neighboring dots which are located around the target dot and are centered on the target dot are detected and two sets of symmetric dots with respect to the target dot are detected among the neighboring dots;
- reading a pattern of the dots arranged within the code frame; and
- performing decoding to reproduce information indicated by the read pattern of the dots.

11. The 2-dimensional code reading method according to claim 10 wherein the detecting a code frame includes performing scanning of only a third region, which is smaller than the second region, in a direction from a center of the third region toward a circumference of the third region.

12. The 2-dimensional code reading method according to claim 10 wherein the second region is set so that the second region is included in the first region.

13. A 2-dimensional code reading apparatus comprising:
- an input unit configured to receive an input image that is formed by optically reading 2-dimensional codes printed on a print medium with a document page;
- a code position detector configured to detect the 2-dimensional codes from the received input image wherein the 2-dimensional codes are constituted by dots and a code frame is detected from the dots detected from the received input image, the code frame defining a fixed rectangular region by frame dots arranged in a matrix formation at a predetermined spacing in each of two orthogonal directions, said code position detector configured to determine that a target dot is a corner dot of the code frame when four or more neighboring dots which are located around the target dot and are centered on the target dot are detected and two sets of symmetric dots with respect to the target dot are detected among the neighboring dots;
- a data acquisition unit configured to acquire digital information from the detected 2-dimensional codes;
- an error correction unit configured to perform error correction coding of the digital information; and
- a decoder configured to decode the digital information after the error correction coding is performed,
- wherein the error correction unit comprises a storage unit configured to store a part of the digital information as known information, and a data permutation unit configured to replace a portion of the digital information from the data acquisition unit with the known information from the storage unit.

14. A coordinates input device which receives an input image of 2-dimensional codes printed on a print medium with a document page and containing identification information, which includes:
- a 2-dimensional code reading apparatus; and
- a positional information storage unit configured to store correlation of the identification information and positional information read by the 2-dimensional code reading apparatus,
- the 2-dimensional code reading apparatus comprising:
- an input unit configured to receive an input image that is formed by optically reading 2-dimensional codes printed on a print medium with a document page;
- a code position detector configured to detect the 2-dimensional codes from the received input image wherein the 2-dimensional codes are constituted by dots and a code frame is detected from the dots detected from the received input image, the code frame defining a fixed rectangular region by frame dots arranged in a matrix formation at a predetermined spacing in each of two orthogonal directions, said code position detector configured to determine that a target dot is a corner dot of the code frame when four or more neighboring dots which are located around the target dot and are centered on the target dot are detected and two sets of symmetric dots with respect to the target dot are detected among the neighboring dots;
- a data acquisition unit configured to acquire digital information from the detected 2-dimensional codes;
- an error correction unit configured to perform error correction coding of the digital information; and
- a decoder configured to decode the digital information after the error correction coding is performed,
- wherein the error correction unit comprises a storage unit configured to store a part of the digital information as known information, and a data permutation unit configured to replace a portion of the digital information from the data acquisition unit with the known information from the storage unit.

15. A 2-dimensional code reading method comprising:
- receiving an input image that is formed by optically reading 2-dimensional codes printed on a print medium with a document page;
- detecting the 2-dimensional codes from the received input image wherein the 2-dimensional codes are constituted by dots and a code frame is detected from the dots detected from the received input image the code frame defining a fixed rectangular region by frame dots arranged in a matrix formation at a predetermined spacing in each of two orthogonal directions, the detecting the 2-dimensional codes including determining that a target dot is a corner dot of the code frame when four or more neighboring dots which are located around the target dot and are centered on the target dot are detected and two sets of symmetric dots with respect to the target dot are detected among the neighboring dots;
- acquiring digital information from the detected 2-dimensional codes;
- performing error correction coding of the digital information; and
- performing decoding of the digital information after the error correction coding is performed;
- wherein the performing error correction coding includes storing a part of the digital information as known information, and replacing a portion of the digital information from the data acquisition unit with the known information.

16. A computer program product embodied therein for causing a computer to execute a 2-dimensional code reading method, the method comprising:

receiving an input image that is formed by optically reading 2-dimensional codes printed on a print medium with a document page;

detecting the 2-dimensional codes from the received input image wherein the 2-dimensional codes are constituted by dots and a code frame is detected from the dots detected from the received input image, the code frame defining a fixed rectangular region by frame dots arranged in a matrix formation at a predetermined spacing in each of two orthogonal directions, the detecting the 2-dimensional codes including determining that a target dot is a corner dot of the code frame when four or more neighboring dots which are located around the target dot and are centered on the target dot are detected and two sets of symmetric dots with respect to the target dot are detected among the neighboring dots;

acquiring digital information from the detected 2-dimensional codes;

performing error correction coding of the digital information; and performing decoding of the digital information after the error correction coding is performed;

wherein the performing error correction coding includes storing a part of the digital information as known information, and replacing a portion of the digital information from the data acquisition unit with the known information.

* * * * *

UNITED STATES PATENT AND TRADEMARK OFFICE
CERTIFICATE OF CORRECTION

| | | |
|---|---|---|
| PATENT NO. | : 7,712,664 B2 | Page 1 of 1 |
| APPLICATION NO. | : 11/245082 | |
| DATED | : May 11, 2010 | |
| INVENTOR(S) | : Takahashi et al. | |

It is certified that error appears in the above-identified patent and that said Letters Patent is hereby corrected as shown below:

On the title page, the Terminal Disclaimer information has been omitted. Item (45) and the Notice information should read as follows:

--(45) Date of Patent: *May 11, 2010

(*) Notice: Subject to any disclaimer, the term of this patent is extended or adjusted under 35 U.S.C. 154(b) by 1185 days.

This patent is subject to a terminal disclaimer.--

Signed and Sealed this

Seventeenth Day of August, 2010

David J. Kappos
*Director of the United States Patent and Trademark Office*